(12) United States Patent
Hawblitzel et al.

(10) Patent No.: US 9,363,087 B2
(45) Date of Patent: Jun. 7, 2016

(54) END-TO-END SECURITY FOR HARDWARE RUNNING VERIFIED SOFTWARE

(71) Applicant: Microsoft Technology Licensing, LLC, Redmond, WA (US)

(72) Inventors: Chris Hawblitzel, Redmond, WA (US); Bryan Parno, Redmond, WA (US); Jacob R. Lorch, Bellevue, WA (US); Jonathan R. Howell, Seattle, WA (US); Brian D. Zill, Bellevue, WA (US)

(73) Assignee: Microsoft Technology Licensing, Inc., Redmond, WA (US)

( * ) Notice: Subject to any disclaimer, the term of this patent is extended or adjusted under 35 U.S.C. 154(b) by 75 days.

(21) Appl. No.: 14/505,236

(22) Filed: Oct. 2, 2014

(65) Prior Publication Data

US 2016/0099811 A1 Apr. 7, 2016

(51) Int. Cl.
| | |
|---|---|
| H04L 9/32 | (2006.01) |
| H04L 9/30 | (2006.01) |
| H04L 29/06 | (2006.01) |
| G06F 21/57 | (2013.01) |
| H04L 9/08 | (2006.01) |

(52) U.S. Cl.
CPC ............ *H04L 9/3247* (2013.01); *G06F 21/575* (2013.01); *H04L 9/0825* (2013.01); *H04L 9/30* (2013.01); *H04L 9/3268* (2013.01); *H04L 63/0823* (2013.01); *G06F 2221/034* (2013.01)

(58) Field of Classification Search
CPC .................................................. H04L 9/3247
See application file for complete search history.

(56) References Cited

U.S. PATENT DOCUMENTS

| | | | |
|---|---|---|---|
| 7,818,729 | B1 | 10/2010 | Plum et al. |
| 7,840,801 | B2 | 11/2010 | Berger et al. |
| 8,104,021 | B2 | 1/2012 | Erlingsson et al. |
| 2008/0168275 | A1 | 7/2008 | De Atley et al. |
| 2008/0320308 | A1 | 12/2008 | Kostiainen et al. |
| 2011/0154500 | A1 | 6/2011 | Sahita et al. |

(Continued)

FOREIGN PATENT DOCUMENTS

EP 1182557 A2 2/2002

OTHER PUBLICATIONS

Adams, Scott, "Tour of Accounting", retrieved on Aug. 1, 2014 at http://dilbert.com/strips/comic/.

(Continued)

*Primary Examiner* — Andrew Nalven
*Assistant Examiner* — Khang Do
(74) *Attorney, Agent, or Firm* — Alin Corie; Sandy Swain; Micky Minhas

(57) ABSTRACT

A verified software system may be executable on secure hardware. Prior to being executed, the software system may be verified as conforming to a software specification. First credentials attesting to an identity of the software system may be sent to an external application. Second credentials signed by a provider of the secure hardware may be sent to the external application. The second credentials may attest to an identity of the secure hardware. The external application may securely exchange one or more messages with a software application of the software system. For example, the one or more messages may be decryptable only by the external application and the software application to provide confidentiality for each message. As another example, an attestation may vouch for an identity of a sender of each of the one or more messages to attest to an integrity of each message.

20 Claims, 10 Drawing Sheets

(56) References Cited

U.S. PATENT DOCUMENTS

| | | | |
|---|---|---|---|
| 2011/0173643 | A1 | 7/2011 | Nicolson et al. |
| 2012/0166795 | A1 | 6/2012 | Wood et al. |
| 2012/0266213 | A1* | 10/2012 | Spiers ................. H04L 63/0218 726/3 |
| 2013/0031371 | A1 | 1/2013 | McLellan et al. |
| 2013/0117564 | A1 | 5/2013 | Chang et al. |
| 2013/0151848 | A1* | 6/2013 | Baumann .............. H04L 9/3263 713/164 |
| 2014/0188732 | A1 | 7/2014 | Kobres |
| 2015/0200934 | A1* | 7/2015 | Naguib ................... G06F 21/57 713/2 |

OTHER PUBLICATIONS

Alkassar, et al., "Balancing the Load: Leveraging Semantics Stack for Systems Verification", Journal of Automated Reasoning, vol. 42, No. 2, Apr. 2009, 60 pages.
"AMD64 Architecture Programmer's Manual", Advanced Micro Devices, May 2013, 386 pages.
Balacheff, et al., "Trusted computing platforms TCPA technology in context", Prentice Hall, Aug. 1, 2014, 1 page.
Barnett, et al., "Boogie: A Modular Reusable Verifier for Object-Oriented Programs", Proceedings of the 5th international conference on Formal Methods for Components and Objects, Nov. 7, 2006, 24 pages.
Barthe, et al., "Computer-Aided Security Proofs for the Working Cryptographer", Proceedings of the 31st annual conference on Advances in cryptology, Aug. 14, 2011, 17 pages.
Barthe, et al., "Probabilistic Relational Reasoning for Differential Privacy", Proceedings of the 39th annual ACM SIGPLAN-SIGACT symposium on Principles of programming languages, Jan. 25, 2012, 13 pages.
Barthe, et al., "Probabilistic Relational Verification for Cryptographic Implementations", Proceedings of the 41st ACM SIGPLAN-SIGACT Symposium on Principles of Programming Languages, Jan. 22, 2014, 13 pages.
Barthe, et al., "Secure Information Flow by Self-Composition", Proceedings of the 17th IEEE Computer Security Foundations Workshop, Jun. 28, 2004, 15 pages.
Benton, Nick, "Simple relational correctness proofs for static analyses and program transformations", Proceedings of the 31st ACM SIGPLAN-SIGACT Symposium on Principles of Programming Languages, Jan. 14, 2004, 12 pages.
Bhargavan, et al., "Implementing TLS with Verified Cryptographic Security", IEEE Symposium on Security and Privacy, May 19, 2013, 15 pages.
Bruschi, et al., "Replay Attack in TCG Specification and Solution", Proceedings of the 21st Annual Computer Security Applications Conference, Dec. 5, 2005, 11 pages.
Cachin, Christian, "Distributing Trust on the Internet", International Conference on Dependable Systems and Networks, Jul. 1, 2001, 10 pages.
Dam, et al., "Formal Verification of Information Flow Security for a Simple Arm-Based Separation Kernel", Proceedings of the 2013 ACM SIGSAC conference on computer & communications security, Nov. 4, 2013, 12 pages.
Datta, et al., "A Logic of Secure Systems and its Application to Trusted Computing", Proceedings of the 30th IEEE Symposium on Security and Privacy, Jun. 1, 2009, 50 pages.
Denning, Dorothy Elizabeth Robling, "Secure Information Flow in Computer Systems", Doctoral Dissertation, Jul. 31, 2014, 1 page.
Drzevitzky, Stephanie, "Proof-Carrying Hardware: Runtime Formal Verification for Secure Dynamic Reconfiguration", International Conference on Field Programmable Logic and Applications, Aug. 31, 2010, 4 pages.
Dwork, et al., "Calibrating Noise to Sensitivity in Private Data Analysis", Proceedings of the Third conference on Theory of Cryptography, Mar. 4, 2006, 20 pages.

Dwork, Cynthia, "Differential Privacy", Preceedings of 33rd International Colloquium on Automata, Languages and Programming, part II, Jul. 2006, 12 pages.
Fahndrich, et al., "Language Support for Fast and Reliable Message-based Communication in Singularity OS", In Proceedings of the EuroSys Conference, Apr. 18, 2006, 14 pages.
Fraim, Lester J., "SCOMP: A Solution to the Multilevel Security Problem", Computer Journal, vol. 16 Issue 7, Jul. 1983, 8 pages.
Ghosh, et al., "Universally Utility-Maximizing Privacy Mechanisms", Proceedings of the forty-first annual ACM symposium on Theory of computing, May 31, 2009, 9 pages.
Goguen, et al., "Security Policies and Security Models", Proceedings of IEEE Symposium on Security and Privacy, Apr. 1982, 10 pages.
Gold, et al., "KVM/370 in Retrospect", IEEE Symposium on Securityand Privacy, Apr. 1984, pp. 13-23.
Gurgens, et al., "Security evaluation of scenarios based on the TCG's TPM Specification", Proceedings of 12th European Symposium on Research in Computer Security, Sep. 24, 2007, 16 pages.
Haber, et al., "How to Time-Stamp a Digital Document", Journal of Cryptography, vol. 3, No. 2, Jan. 1, 1991, pp. 0-12.
Haeberlen, et al., "Differential Privacy Under Fire", Proceedings of the 20th USENIX conference on Security, Aug. 8, 2011, pp. 1-15.
Hoekstra, et al., "Using Innovative Instructions to Create Trustworthy Software Solutions", In Proceedings of the 2nd International Workshop on Hardware and Architectural Support for Security and Privacy, Aug. 14, 2013, 16 pages.
Jaeger, et al., "PRIMA: Policy-Reduced Integrity Measurement Architecture", Symposium on Access Control Models and Technologies, Jun. 7, 2006, 10 pages.
Kaliski, B., "PKCS #1: RSA Encryption, Version 1.5", Technical Report RFC 2313, Mar. 1998, pp. 1-19.
Karger, et al., "A Retrospective on the VAX VMM Security Kernel", IEEE Transactions on Software Engineering, vol. 17, No. 11, Nov. 1991, pp. 1147-1165.
Klein, et al., "seL4: Formal Verification of an OS Kernel", Proceedings of the ACM SIGOPS 22nd symposium on Operating systems principles, Oct. 11, 2009, pp. 207-220.
Lahiri, et al., "SymDiff: A language-agnostic semantic diff tool for imperative programs", In Proceedings of the 24th international conference on Computer Aided Verification, Jul. 7, 2012, 7 pages.
Lamport, Leslie, "Specifying Systems: The TLA+ Languange and Tools for Hardware and Software Engineers", Addison-Wesley Professional; 1 edition, Jun. 18, 2002, 382 pages.
Leino, K. Rustan M., "Dafny: An Automatic Program Verifier for Functional Correctness", Proceedings of the 16th international conference on Logic for programming, artificial intelligence, and reasoning, Apr. 25, 2010, 19 pages.
Levin, et al., "TrInc: Small Trusted Hardware for Large Distributed Systems", Proceedings of the 6th USENIX symposium on Networked systems design and implementation, Apr. 22, 2009, 14 pages.
Marchesini, et al., "Open-Source Applications of TCPA Hardware", Proceedings of the 20th Annual Computer Security Applications Conference, Dec. 6, 2004, 10 pages.
Mazurek, et al., "Measuring Password Guessability for an Entire University", Proceedings of the ACM SIGSAC Conference on Computer & Communications Security, Nov. 4, 2013, pp. 173-186.
McCune, et al., "Flicker: An Execution Infrastructure for TCB Minimization", Proceedings of the 3rd ACM SIGOPS/EuroSys European Conference on Computer Systems, Apr. 1, 2008, pp. 315-328.
Millen, et al., "Analysis of a Measured Launch", Technical Report 07-0843, Jun. 5, 2007, pp. 1-14.
Miller, Gary L., "Riemann's Hypothesis and Tests for Primality", Journal of Computer and System Sciences, vol. 13, Issue 3, Dec. 1976, pp. 234-239.
Mironov, Ilya, "On Significance of the Least Significant Bits for Differential Privacy", Proceedings of the ACM Conference on Computer and Communications Security, Oct. 16, 2012, pp. 1-18.
Moura, et al., "Z3: An Efficient SMT Solver", Proceedings of the Theory and Practice of Software, 14th International Conference on Tools and Algorithms for the Construction and Analysis of Systems, Mar. 29, 2008, 4 pages.

(56) References Cited

OTHER PUBLICATIONS

Murray, et al., "seL4: from General Purpose to a Proof of Information Flow Enforcement", Proceedings of IEEE Symposium on Security and Privacy, May 19, 2013, pp. 415-429.

"National Vulnerability Database", retrieved on Aug. 1, 2014, at http://web.nvd.nist.gov/view/vuln/detail?vulnId=CVE-2014-0160, National Institute of Standards and Technology, published on Apr. 7, 2014, pp. 1-6.

Parno, Bryan, "Bootstrapping Trust in a 'Trusted' Platform", In Proceeding of 3rd USENIX Workshop on Hot Topics in Security, Jul. 29, 2008, 6 pages.

Parno, et al., "Bootstrapping Trust in Modern Computers", Proceedings of Springer Briefs in Computer Science, Aug. 28, 2011, 111 pages.

Qiu, et al., "Trusted Computer System Evaluation Criteria", National Computer Security Center, Dec. 1985, 116 pages.

Rabin, Michael O., "Probabilistic Algorithm for Testing Primality", Journal of Number Theory, vol. 12, Issue 1, Feb. 1980, pp. 128-138.

Reed, et al., "Distance Makes the Types Grow Stronger: A Calculus for Differential Privacy", Proceedings of the 15th ACM SIGPLAN International Conference on Functional Programming, Sep. 27, 2010, pp. 157-168.

Roy, et al., "Airavat: Security and Privacy for MapReduce", Proceedings of the 7th USENIX Conference on Networked Systems Design and Implementation, Apr. 28, 2010, pp. 1-16.

Sabelfeld, et al., "Language-Based Information-Flow Security", IEEE Journal on Selected Areas in Communications, vol. 21, Issue 1, Jan. 2003, pp. 1-15.

Sailer, et al., "Design and Implementation of a TCG-based Integrity Measurement Architecture", Proceedings of the 13th USENIX Security Symposium, Aug. 9, 2004, 17 pages.

Schockley, et al., "An Overview of the GEMSOS Class A1 Technology and Application Experience", Proceedings of the 11th National Computer Security Conference, Oct. 1988, 1 pages.

"Secure Hash Standard (SHS)", Federal Information Processing Standards Publication 180-4, Mar. 2012, 35 pages.

"Securing the Windows 8 Boot Process", retrieved on Aug. 1, 2014, at http://technet.microsoft.com/en-us/windows/dn168167.aspx.

Simma, et al., "Retaining Control over Private Virtual Machines Hosted by a Cloud Provider Using Mandatory Access Control, Trusted Boot and Attestation", 13th European Conference on Cyber Warfare and Security, Jul. 3, 2014, 10 pages.

Stubblebine, et al., "Fair On-line Auctions Without Special Trusted Parties", Proceedings of the Third International Conference on Financial Cryptography, Feb. 1, 1999, 11 pages.

"The Keyed-Hash Message Authentication Code (HMAC)", In Federal Information Processing Standards Publication FIPS PUB 198-1, Jul. 2008, 13 pages.

"Trusted Computing: An Already Deployed, Cost Effective, ISO Standard, Highly Secure Solution for Improving Cybersecurity", Wave Systems Corp. response to Department of Commerce Internet Policy Task Force Notice of Inquiry Section 4. Authentication/Identity (ID) Managment, Jul. 28, 2010, 24 pages.

Yang, et al., "Safe to the Last Instruction: Automated Verification of a Type-Safe Operating System", Proceedings of the ACM SIGPLAN Conference on Programming Language Design and Implementation, Jun. 5, 2010, 12 pages.

Zeldovich, et al., "Making Information Flow Explicit in HiStar", Proceedings of 7th USENIX Symposium on Operating Systems Design and Implementation, vol. 7, Nov. 6, 2006, pp. 263-278.

International Search Report & Written Opinion Issued in PCT Application No. PCT/US2015/053379, Mailed Date: Dec. 18, 2015, 12 Pages.

* cited by examiner

END-TO-END SECURITY FOR HARDWARE RUNNING VERIFIED SOFTWARE

BACKGROUND

When a user submits personal data to a remote service (e.g., cloud-based service), there is no guarantee that the personal data will remain secure or even that the service will produce correct results. At best, the service may have a privacy policy and limit the liability of the service in case of a data breach. However, recent headlines have provided examples of how vulnerability in an operating system, a library, or an application (e.g., software application) may enable personal data to be accessed.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

A verified software system may be executable on secure hardware (e.g., trusted hardware). Prior to being executed, properties of the software system may be verified as conforming to a software specification. First credentials attesting to an identity of the software system may be sent to an external application. Second credentials signed by a provider (e.g., manufacturer) of the secure hardware may be sent to the external application. The second credentials may attest to an identity of the secure hardware. In this way, a system as a whole (e.g., the complete software stack) may be verified at a low level (e.g., assembly language level) and then booted to and executed by secure hardware to provide a secure system. The first credentials and the second credentials may enable the external application to communicate with a software application of the software system in such a way that the messages sent to or received from the software application are encrypted and can be decrypted by the external application and the software application but cannot be decrypted or modified by others.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
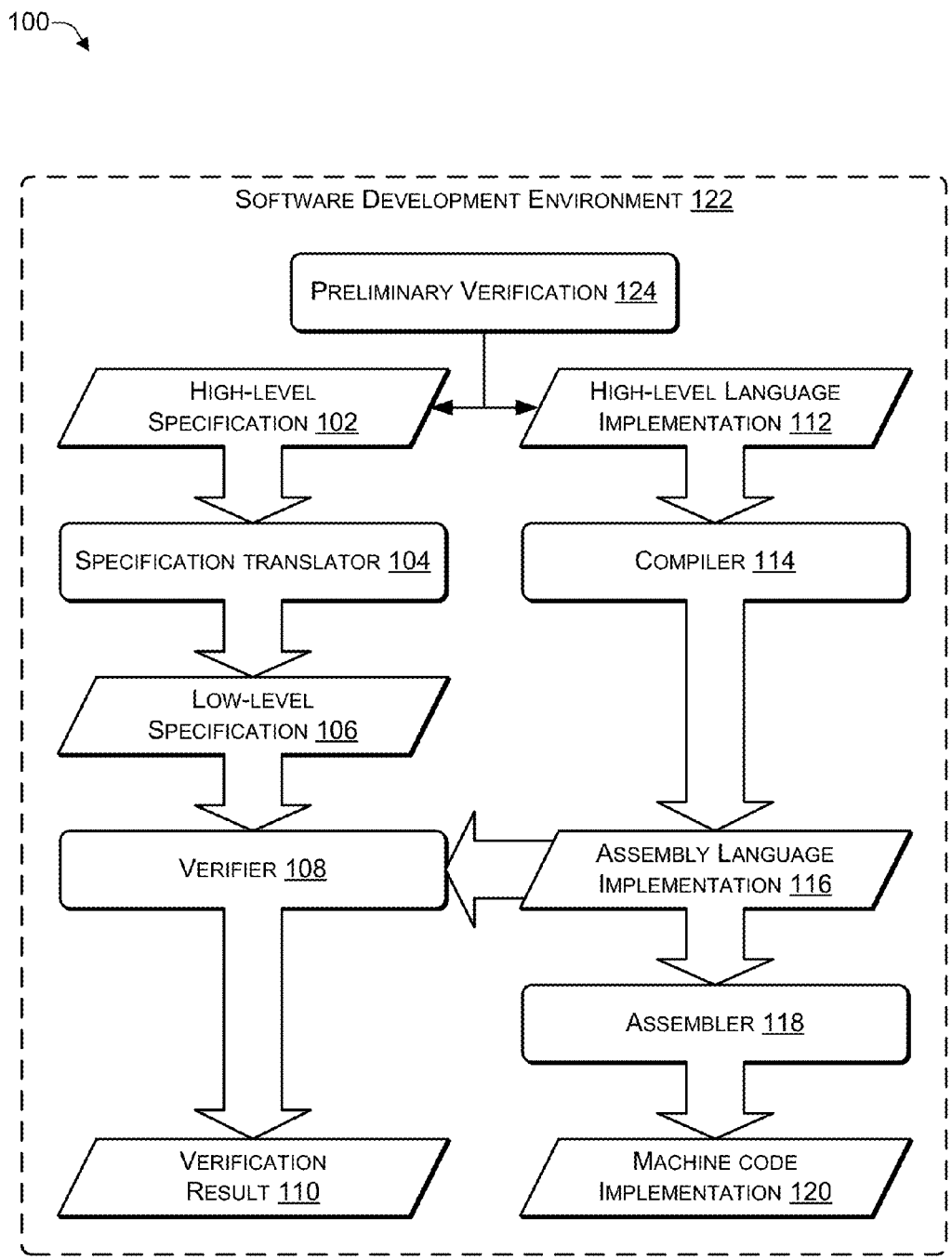
FIG. 1 is an illustrative architecture that includes a specification translator according to some implementations.

A formal verification of a service's software code may provide a mathematical guarantee that the service precisely matches a formally specified security standard. Unfortunately, while software verification may provide a strong guarantee about the trustworthiness of software code, the computational cost may be so high that service providers may be unable to perform software verification of their entire system. As a result, service providers at most may provide strong guarantees about small programs written in a high-level language that are surrounded by large quantities of unverified software code. For example, a verified transport layer security protocol implementation may rely on an unverified operating system and unverified software libraries. As another example, a machine-checked proof of correctness for a public key cryptosystem (e.g., RSA or similar system) may assume the correctness of the crypto libraries that implement the public key cryptosystem, the corresponding runtime libraries, and the operating system. As a further example, a microkernel that relies on a trusted assembly code may make no claims as to the correctness of application-level semantics. Thus, a service may be unable to perform a complete formal verification of the service's software code and may therefore be unable to provide a mathematical guarantee that the service precisely matches a formally specified security standard.

The systems and techniques described herein may be used to execute applications that have been verified as end-to-end secure, such that the verification covers all of the software code ("code") that may be executed, e.g., the code that has been verified includes not just the applications but also the operating system, the libraries (runtime libraries, program libraries, dynamic libraries), and the drivers that may be executed. Thus, in some cases, no assumptions need be made that any portion of the software executing on one or more servers is correct. The code that undergoes verification is the assembly code that gets executed, rather than any high-level language(s) in which the code may be written. The verification process may assume that the hardware is correct, but makes no assumption regarding the correctness of the compiler or the runtime execution of the code. The verification process may thus demonstrate that the entire system implements a functionally correct version of a high-level abstract state machine of the code. The verification process may demonstrate secure remote equivalence, e.g., that a remote user can establish a secure channel to code whose outputs cannot be distinguished from the output of the high-level abstract state machine.

Verifying that the code executing on the server(s) is functionally correct and demonstrating the remote equivalence may enable the verification process to provide a full specification and proof for the entire system's behavior, detailing how the system (e.g., software code and hardware) will behave in every possible situation. Proving remote equivalence may incorporate (i) proving the functional correctness of properties and (ii) proofs of noninterference, which involves proving relational properties of code (e.g., properties about how two runs of the same code with different inputs relate to one another). In addition, remote equivalence can be strengthened to provide secure remote equivalence via Trusted Computing (e.g., as specified by the Trusted Computing Group, an international industry standards group that develops and publishes specifications for implementation by the industry). For example, secure hardware, such as a Trusted Platform Module (TPM), may be used to certify (e.g., via an attestation) that a public key corresponds to a private key that is known only to the code that is being executed on the server(s). A remote user may use the public key to create a secure channel to the code, thereby achieving security commensurate with direct communication with the code's abstract state machine. Combining attestation with fully verified code may thus provide an extremely high assurance of end-to-end security.

The techniques and systems described herein may enable software developers to develop verifiably secure applications with modest developer effort compared to using conventional techniques. For example, conventional techniques may typically take tens of person-years to verify a single software layer, so verifying a complete software stack (e.g., applications, operating system, drivers, and the like) using conventional techniques may be computationally prohibitive. To reduce developer effort, the techniques and systems described herein may be used to perform fast, automated, end-to-end software verification of systems software. The term "software stack" refers to an entire software system, e.g., such as an operating system, device drivers, software libraries, applications, and any layers in-between.

To verify code correctly at the assembly level (e.g., with modest developer effort), a software developer may use two new tools that are described herein. First, a specification translator may enable a software developer to write specifications efficiently in a high-level language and then verify that the corresponding assembly code meets the specifications because the specification translator can translate a high-level specification (e.g., expressed as a state machine) to a low-level specification. Second, a compiler that compiles verifiable code in a high-level language to verifiable assembly language may be used to translate both the code and the corresponding proofs from a high-level language to low-level assembly code (or machine code). Such a compiler may enable a software developer to quickly write and check high-level code and prove properties associated with the executable assembly code. For example, the software for an entire system (or any subset thereof), including applications, libraries, drivers, and operating system, may be compiled to a single program that is comprised of verifiable assembly code. The correctness of the entire system code (e.g., as a whole) is verified, such that there is no unverified code in the entire system code and there are no unverified gaps between the different components of the system. As an example of a gap, suppose a first component X is described as performing Q, and a second component Y is described as performing R using another component (X) that does Q. If X means something different by Q than Y does, then Y's guarantee that Y performs R might not hold, thereby creating a gap. The verification process verifies that there are no unverified gaps between two (or more) components of the system.

In addition, the verification process verifies that each component of the system is incapable of subverting the specification of another component of the system. For example, an application may be verified to not subvert the operating system's memory management subsystem, and the operating system's memory management subsystem may be verified to not subvert the application.

Several software applications, each useful as a standalone service, are provided as examples of verifiable software code. For example, a notary application to securely assign logical timestamps to objects (e.g., files, documents, etc.) so that they can be conclusively ordered is described. The notary application includes a state that includes a monotonically increasing counter, and that responds to notarization requests by incrementing the counter, signing (e.g., using a signature) a statement linking the counter value to the request, and replying with the statement and the signature. The other three applications include a password hasher, a trusted counter for use by multiple users, and a differentially-private database that maximizes the accuracy of queries to databases while minimizing the chances of identifying the records of the databases.

Thus, techniques and systems are described below with reference to the accompanying figures that provide, via automated full-system verification, externally checkable, fully verified software at the assembly level. A collection of example tools, techniques, and software engineering disciplines for building relatively large-scale end-to-end verified systems are also described. In addition, an example approach to proving information-flow-based security properties of assembly-level code via verification of relational properties and example techniques for systems developers to use for formal verification. The software and the hardware may each provide credentials attesting to their respective identities to verify that communications with the software are secure.

Illustrative Architectures

FIG. 1 is an illustrative architecture 100 that includes a specification translator according to some implementations. In some implementations, the architecture 100 may be used to provide remote equivalence and end-to-end verification.

Remote equivalence provides an assurance regarding the equivalence between each application and its corresponding state machine. For example, a remote device communicating with an application over an untrusted network may be assured of receiving the same sequence of messages as the remote device would receive communicating with a corresponding (e.g., corresponding to the application) state machine over an untrusted network. For example, a notary application's specification may indicate that the notary application signs a monotonically increasing counter. Knowing that the system matches this specification, a remote device may be provided an assurance that, for example, a running system (i) does not allow the counter to roll back, (ii) does not share a private key, (iii) does not provide signed statements for anything except notarizations, (iv) computes the signature correctly, and (v) is not susceptible to buffer overflows, integer overflows, or other implementation-level vulnerabilities.

The architecture 100 may enable a remote device to establish a secure channel to an application. Establishing a secure channel to an application may eliminate the ability of an untrusted network to interfere with communications between the remote device and the application. For example, the notary application's specification may state that the notary application computes key-pairs using randomness from a trusted platform and then obtains an attestation of the public key and the application's code from the trusted platform. Thus, a remote device receiving the attestation may determine that notarizations signed with the corresponding private key were generated on the trusted platform by the notary application's code and can therefore be treated as if the notarizations signed with the corresponding private key were generated by a state machine corresponding to the notary application.

In addition to security assurances, no implicit trust is placed in any software applications that run on the system. Thus, every software component is either (i) verified as being secure or (ii) executed in a verified sandbox environment that prevents the software component from affecting the security of other components of the system.

In addition, rather than merely independently verify each component in a system, the entire system as a whole may be verified. By doing so, the security of the system may avoid incorrect assumptions about how the software components of the system interact. No implicit trust is placed in the compiler used to generate the software that is to be executed. Thus, the instructions (e.g., assembly code) to be executed are verified rather than merely the high-level source code that will be compiled to create the instructions.

The code for the system may be written in a language that is designed to support verification (e.g., rather than in a conventional computer language). When designing the code, algorithms and code patterns that facilitate proofs of correctness (e.g., rather than performance) may be selected to provide a system that is easily verifiable. The code may be optimized without worrying that the optimizations may introduce bugs because the verification tools are designed to catch any errors that might be introduced by the optimization techniques.

The verified system may provide security against software-based attacks. For example, an adversary may execute software on a server before a verified application executes and/or after the verified application terminates. The adversary may compromise the server's firmware, basic input/output system (BIOS), or a peripheral device, (e.g., a network card). In some cases, the system may assume that the central processing unit (CPU), memory, chipset, and trusted platform module are behaving correctly, and assumes that the adversary does not mount a physical attack (e.g., electrically probing the memory bus, etc.).

The architecture 100 may include a high-level specification 102, a specification translator 104, a low-level specification 106, a verifier 108, a verification result 110, a high-level language implementation 112, a compiler 114, an assembly language implementation 116, assembler 118, and a machine code implementation 120. For example, a user may create the high-level specification 102 and the high-level language implementation 112. The specification translator 104 may translate the high-level specification 102 (e.g., a finite state machine) into a low-level specification 106.

The compiler 112 may compile the high-level language implementation 112 into the assembly language implementation 114. The verifier 108 may automatically (e.g., without human interaction) perform various functions, such as verifying that the assembly language implementation 116 corresponds to the low-level specification 106. After the assembly language implementation 114 has been verified by the verifier 108 as corresponding to the low-level specification 106, the assembly language implementation 116 may be converted by the assembler 118 into executable code in the form of the machine code implementation 116. Assembly language is an example of a low-level language for a computer, or other programmable device, in which there is generally a one-to-one correspondence between the assembly language and the machine code instructions that are executed by the hardware processors.

A verification stack (e.g., based on Floyd-Hoare or similar reasoning) may be used to prove the functional correctness of code. The high-level specification 102 and the high-level language implementation 112 may be implemented using a high-level language that is designed to be verifiable. The high-level language may have built-in specification constructs. The verifier 108 may be a static program verifier that may be used to verify the functional correctness of software programs written in the high-level language. The high-level language may be designed to support the static verification of programs. The high-level language may include various features, such as being imperative, sequential, support generic classes, provide dynamic allocation and inductive data types, and have built-in specification constructs. The high-level language specification may enable a user to specify pre-conditions, post-conditions, frame specifications (read and write sets), and termination metrics. The high-level language may provide updatable ghost variables, recursive functions, and types, such as sets and sequences. Specifications and ghost constructs may be used by the verifier 108 during verification and may be omitted by the compiler 114 when the compiler 114 is creating the assembly language implementation 116.

In some implementations, the verifier 108 may be run as part of the compiler 114. The programmer may interact with the verifier 108 in a manner similar to a static type checker, e.g., when the verifier 108 produces errors, the programmer may respond by changing one or more of the type declarations, specifications, or statements in the high-level implementation 112. The verifier 108 may automatically fill in low-level proof details.

The compiler 114 may take the high-level language implementation 112 corresponding to the high-level specification 102 and automatically (e.g., without human interaction) translate the high-level language implementation 112 to the verifiable assembly language implementation 116. The assembly language implementation 116 may use an Intermediate Verification Language (IVL) for describing proof obligations to be discharged by a reasoning engine, such as a Satisfiability Modulo Theories (SMT) solver. The IVL may include a verification engine (e.g., the verifier 108) that takes the assembly language implementation 116 as input, generates verification conditions (VCs) for the proof obligations, and passes the VCs to a reasoning engine. The code for an entire system may be verified at the assembly level (e.g., the assembly language implementation 116) using the verifier 108. Any bugs in the high-level language implementation 112 or in the compiler 114 may be identified by the verifier 108. Because some security properties cannot be expressed via functional correctness, techniques are described for verifying relational properties of code (e.g., the high-level language implementation 112). When the verification result 110 indicates that the assembly language implementation 116 has been verified as correct, the trusted assembler 118 may be used to convert the assembly language implementation 116 to the machine code implementation 120 (e.g., executable code).

Verifying Code Using Reasoning

The verifier 108 may use a type of reasoning (e.g., Floyd-Hoare reasoning or other similar reasoning) to perform verification of the assembly language implementation 116. The high-level language implementation 112 may be annotated with assertions regarding the states that the program may enter, and the verification process may prove that the assertions are valid when the program is running, for all possible inputs to the program. For a program that generates multiple outputs, the specification of the program may be verified using the multiple outputs by annotating the output method with a precondition, which must be true any time the program code is executed.

Thus, to enable the verifier 108 to verify the assembly language implementation 116, the high-level language implementation 112 may specify one or more preconditions, post-conditions, loop invariants, or any combination thereof. The preconditions, post-conditions, loop invariants in the high-level language implementation may be in addition to preconditions and post-conditions included in the high-level specification 102.

Writing a Trustworthy Specification

To enable end-to-end verification of a system, two types of specifications, e.g., a hardware specification and a software specification may be used. For the hardware specification, each assembly instruction that may be executed is specified, to enable low-level verification. The hardware specification describes expectations of the instruction (e.g., ADD that sums multiple registers may expect that summing the multiple registers does not cause an overflow), and the effect(s) of the instruction on the system (e.g., ADD writes back the sum of multiple registers to a destination register).

A software specification may include an abstract description of a desired behavior of the corresponding software application. The abstract description may be written modularly in terms of lower-level library specifications. For example, the software specification for the Notary application may describe (i) how the Notary application's state machine advances and (ii) the outputs permitted in each state. To illustrate, the specification may indicate that one output in a particular state is a signed message which is defined for use in a public key cryptosystem (e.g., RSA) signing.

The high-level specification 102 may use an idiomatic-type of specification that specifies those feature subsets that are used by the system, e.g., without specifying unused features. For example, secure hardware (e.g., trusted hardware, such as a trusted platform module (TPM)) may have hundreds of pages of associated documentation. However, a particular system that uses a subset of the functionality of the trusted hardware may specify the subset of functionality of the trusted hardware without specifying functions of the trusted hardware that are not used in the particular system. Writing the high-level specification 102 to include the functions that are used by a system while excluding unused functions may result in a smaller size for the high-level specification 102 (e.g., as compared to if unused functions were included), thereby enabling easier and more accurate human review of the spec.

Various additional techniques may be used to reduce bugs/errors in a specification (e.g., the high-level specification 102). For example, smaller specifications that include functions used by the system may be verified more easily and faster. As another example, specifications written in a more abstract, declarative fashion than implementation code, may make specification bugs both less likely to occur and easier to find when they do occur.

Producing Verifiable Assembly Language

To enable rapid, large-scale software development while verifying software code at a low-level, the specification and the corresponding assembly language may be verified against each other. For example, the high-level specification 102 may be translated into the low-level specification 106, the high-level language implementation 112 may be compiled into the assembly language implementation 116, and the verifier 108 may verify that the assembly language implementation 116 behaves as specified by the low-level specification 106. This enables a high-level language to be used for the high-level implementation 112 without trusting the compiler 114 and without trusting a run-time environment (e.g., which may use various libraries, runtime components, operating system utilities, or the like).

Verifying Relational Properties

In addition to functional correctness, the verifier 108 may verify that an application does not provide ("leak") information about secret data (e.g., data that is to be kept private or to which there is restricted access), such as private keys. The property of not leaking information about secret data is referred to as non-interference. Suppose that variable S represents secret data inside an application and I represents a public input to the application. As previously discussed, the statement $O:=(S+S)+(I+I)$ satisfies a functional correctness specification, e.g., even(O). However, the output O may enable an outsider (e.g., an unauthorized program) to determine the secret S, e.g., by computing $O/2-I$. In this example, the secret S is leaked to the outside. In contrast, the statement $O:=(S-S)+(I+I)$, satisfies even(O) but does not provide information about S in the output O because the value stored in O depends on the value in I but is independent of S. To verify that a program does not provide information about secret data, the verifier 108 may analyze multiple executions of a program and compare the outputs of the executions of the program to determine on which values the outputs depend. Suppose that the public input I is passed to all the executions of the program, but the secret S is varied among the executions of the program. If all the executions of the program produce the same output O regardless of S, then O is independent of S and the program does not provide information about S. If at least one execution of the program produces a different output from the remaining executions of the program, then the program may provide information about S. Thus, it is possible to prove that O is independent of S by proving that no two executions of the program produce a different O when given the same I but a different S. Mathematically, the idea is to prove that for all possible pairs of executions (call the two executions in each pair L and R, for left and right), if the public inputs I are equal but the secrets S may be different, then the outputs O may be equal, e.g., $\forall SL, S_R. I_L=I_R => O_L=O_R$. While the statement $O:=(S-S)+(I+I)$ satisfies the condition, $O:=(S+S)+(I+I)$ does not satisfy the condition (e.g. with counterexample $I_L=I_R=1$ and $S_L=2$ and $S_R=3$).

To determine that an application does not expose secret data, a developer may annotate code with explicit relational annotations. For example, xL may be written as left(x) and xR may be written as right(x):

program Test(S, I) returns(O) requires left(I)==right(I);
    ensures left(O)==right(O);
    ensures even(O);
    {O:=(S−S)+(I+I);}

In this example, the relational precondition left(I)==right (I) instructs the verifier 108 to determine whether IL=IR wherever Test is called, and the relational post-condition left (O)==right(O) instructs the verifier 108 to determine whether IL=IR=>OL=OR. For most of our code, the verifier 108 may leverage existing functional correctness annotations and so the developer may not provide relational annotations. For example, the verifier 108 may use the functional post-condition in the code:

program ComputeIpChecksum(I) returns(O) ensures P==IpChecksum(I);
to determine that if IL=IR, then IpChecksum(IL)=IpChecksum(IR), so OL=OR.

Proving Security Properties

Requiring (and verifying) that the output of a program is independent of secret data in the program may be too strict (e.g., impractical and unnecessary) a condition for most real-world systems. Typically, a program may allow limited influence of secret data on the output, such as using a secret key to sign the output. A security policy for such programs may explicitly declassify certain values, such as a signature, so that the signature can be included in the output.

Figure 2:
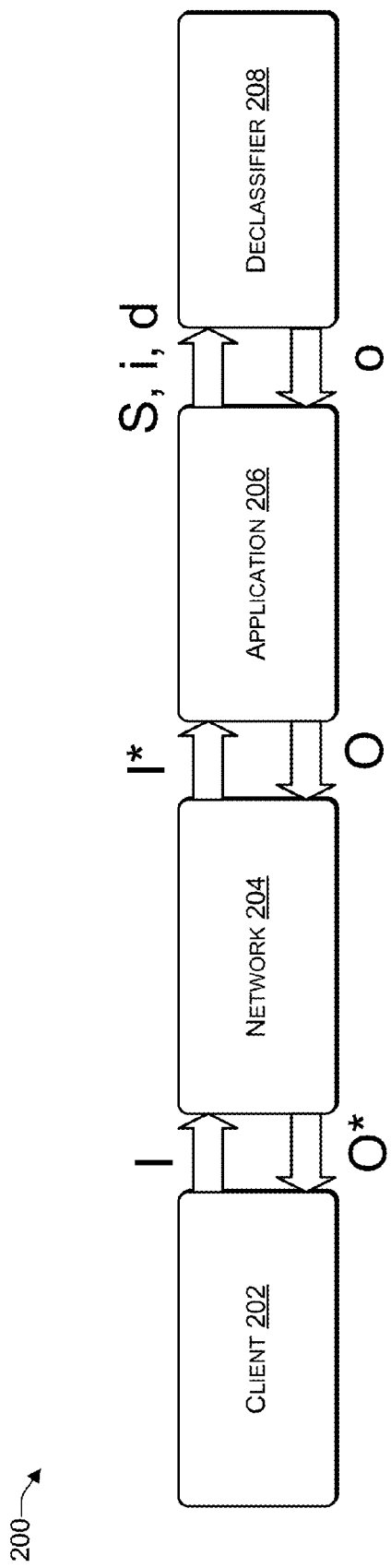
FIG. 2 is an illustrative architecture that includes an application according to some implementations.

FIG. 2 is an illustrative architecture 200 that includes a client, a network, an application, and a declassifier according to some implementations. The architecture 200 illustrates the structure of a verified system, including a client 202, a network 204, an application 206, and a declassifier 208. The declassifier 208 may authorize the release of selected outputs that are derived from secret data. An application's declassification policy may be represented as a state machine that corresponds to the high-level behavior specified by the application's specification. The client 202 may communicate with the (verified) application 206 across the network 204. For example, the client 202 may send input data I over the network 204. The network 204 may drop, delay, duplicate, or mangle the input data I. The network 204 may not have access to the secret data of the application 206. The application 206 may receive a mangled version I* of the input data I and respond by sending output O across the network 204. The network 204 may mangle the output O and provide a mangled version O* to the client.

When computing the output O, the application 206 may invoke the declassifier 208 policy one or more times. Each time the declassifier 208 is invoked, the application 206 may pass secret data S, inputs i, and a desired declassified output d to the declassifier 208. For successful verification, the desired declassified output d will equal the output according to a declassification policy of the state machine that specifies: d=StateMachineOutput(S; i). When the verifier 108 performs static verification and determines that the declassification policy of the state machine is satisfied, the declassifier 208 produces declassified output o that the application 206 can use as part of the output O.

In some implementations, o may equal d, so that the declassifier 208 is a no-op (no operation) during run-time. Nevertheless, the information that the declassifier 208 is a no-op may not be disclosed to the verifier 108, such that oL=oR can be disclosed without disclosing dL=dR. In some cases, e.g., where the secret data S could be determined using brute-force search on d (e.g., by factoring a public key), dL=dR might imply SL=SR, which is undesirable.

Examples of Secure Applications

Four examples of verified secure applications (e.g., referred to as Ironclad applications) are discussed. The proof for each application builds on previously proven proofs of lower-level libraries, drivers, and operating systems. Each application may compile to a standalone system image that communicates with other machines via a protocol, such as, for example, user datagram protocol (UDP). Each example application is a useful and complete application that could merit at least one dedicated machine in a data center. Hardware support for fine-grained secure execution environments may enable multiplexing multiple Ironclad applications.

Notary Application

The Notary application securely assigns logical timestamps to documents so that the documents may be conclusively ordered. In a conventional system, users of such a timestamp service assume that a machine is executing correct software. The Notary application described herein requires no such assumption.

NOTARY REMOTE EQUIVALENCE. The Notary application is equivalent to a state machine with the following state:

A (PublicKey, PrivateKey) pair is computed using a cryptosystem (e.g., RSA) key generation algorithm from the first consecutive sequence of random bytes read from trusted hardware.

A trusted hardware platform in which a Platform Configuration Register (e.g., PCR 19) has been extended with the public part of the key pair; and A counter Counter that is initialized to 0;

and the following transitions:

Given input (connect, Nonce), the trusted hardware state is changed by obtaining a quote Quote over PCRs 17-19 and external nonce Nonce. Output is (PublicKey; Quote).

Given input (notarize, Hash), increment Counter and returns $Sig_{PrivateKey}$(OP-CTR-ADV||RFC4251Encode(Counter)||Hash).

A PCR is a register that allows secure storage and reporting of security relevant metrics. A portion of the specification for the Notary application may include a predicate that is to be satisfied before out_sig is declassified (which otherwise cannot be output because of dependency on secret data):

datatype NotaryState=NotaryState_c(keys:RSAKeyPair, cntr:nat);

predicate NotarizeOpCorrect(in_st:NotaryState, out_st: NotaryState, in_msg:seq<int>, out_stmt: seq<int>, out_sig:seq<int>)
{
ByteSeq(in_msg)
&& out_st.keys==in_st.keys
&& out_st.cntr==in_st.cntr+1
&& out_stmt==[OP_COUNTER_ADV]
+rfc4251_encode(outst.cntr)+in_msg
&& out_sig==RSASign(in_st.keys, out_stmt)
}

Proving Notary Equivalence may include proofs of (1) input non-interference, (2) functional correctness of a Connect program, (3) functional correctness of the Notary program, and (4) output non-interference. (1) Input non-interference: the nonce and message the Notary application passes to the declassifier 208 are based on public data. (2) Functional correctness of connect: the application derives the key from randomness correctly and the trusted hardware quote the application obtains comes from the trusted hardware when its PCRs are in the required state. (3) Functional correctness of notarize: the app increments the counter and computes the signature correctly. (4) Output non-interference: Writes to unprotected memory depend only on public data and the computed state machine outputs.

TrInc Application

Figure 3:
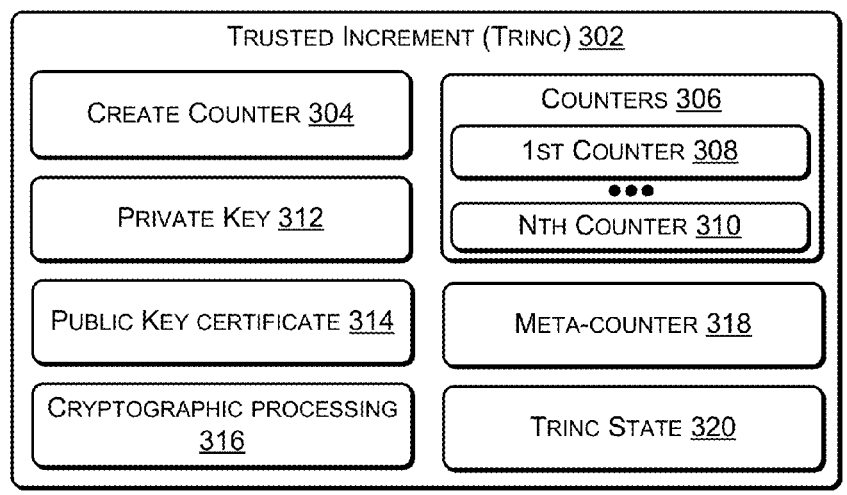
FIG. 3 is an illustrative architecture that includes a trusted increment (TrInc) application according to some implementations.

FIG. 3 is an illustrative architecture 300 that includes a TrInc application 302 according to some implementations.

A trusted increment application, known as TrInc 302, generalizes the Notary application. TrInc 302 maintains per-user (e.g., per-application) counters, so that each user (e.g., each application) receives consecutive values between which there are no gaps. TrInc 302 is a versatile tool in distributed systems, as TrInc 302 may be used for various functions, such as, for example, tamper-resistant audit logs, Byzantine-fault-tolerant replicated state machines, verifying that an un-trusted file server behaves correctly, etc. TrInc 302 may include a create counter 304 module to enable the creation of counters 306. The counter 306 may include N counters (where N>0), such as a first counter 308 to an Nth counter 310. TrInc 302 may include a private key module 312, a public key certificate module 314, a cryptographic processing module 316, a meta-counter 318, and a TrInc state indicator 320.

TRINC REMOTE EQUIVALENCE. The TrInc application 302 is remotely equivalent to a state machine like the Notary application except that TrInc has multiple counters, each a tuple (Ki;vi), and a meta-counter that is initially set to 0. In place of the notarize transition TrInc has:
Given input (create,K),
set i:=meta_counter,
increment meta_counter, and
set (Ki,vi)=(K,0).
Given input (advance; i, $v_{new}$, Msg, UserSig), let $v_{old}$=vi in counter tuple i.
If void <=vnew and VerifySig$_{Ki}$($v_{new}$||Msg, UserSig), the set $v_i$:=$v_{new}$ and output Sig$_{PrivateKey}$(OP-CTR-ADV||encode(i)||encode($v_{old}$)||encode($v_{new}$)||Msg).

Password Hashing ("PassHash") Application

A password hashing application may render harmless the loss of a password database. For example, attackers may steal databases and mount offline attacks. Even when a database is properly hashed and salted, low-entropy passwords make the database vulnerable. By using password hashing, unauthorized access to the hashed passwords does not compromise security.

PASSHASH REMOTE EQUIVALENCE. The PassHash application is remotely equivalent to the following state machine. The state consists of a byte string Secret, initialized to the first 32 random bytes read from the trusted hardware. Given input (hash, Salt, Password), the passhash application outputs SHA256(Secret||Salt||Password). Here, SHA256 is used merely as an example of a hashing algorithm. It should be understood that other similar hashing techniques may be used instead of SHA.

Based on this specification, the hashed passwords are useless to an offline attacker because without the secret, a brute-force guessing attack on even low-entropy passwords is not feasible.

Differential Privacy ("DiffPriv") Service

A differential privacy application provides a differential privacy service and is an example of a larger application (e.g., compared to TrInc etc.) with a more abstract specification. The differential privacy application may collect sensitive data from contributors and allows analysts to study an aggregate database. The differential privacy application may guarantee each contributor's differential privacy, e.g., the answers provided to the analyst are not distinguishable from answers that would have been provided if the contributor's data were omitted. An algorithm A is differentially private with privacy $\epsilon$ if, for any set of answers S and any pair of databases $D_1$ and $D_2$ that differ by a single row, $P[A(D_1) \in S] <= \lambda \cdot P[A(D_2) \in S]$, where the privacy parameter $\lambda = e^\epsilon$.

Multiple queries with small privacy parameters may be equivalent to a single query with the product of the parameters. Beginning with a privacy budget b=$\lambda$, guaranteed to contributors, each query Q with parameter $\lambda_Q$ divides the budget b':=b/$\lambda_Q$ (e.g., a query with $\lambda_Q$>b may be rejected). For a noise computation, calculate $\Delta$, the sensitivity of the query, as being the most the query result can change if a single database row changes. The analyst receives the sum of the true answer and a random noise value drawn from a distribution parameterized by $\Delta$. A noise distribution that only includes rational numbers may be used because the noise distribution can be sampled precisely using an instruction set (e.g., the x86 instruction set).

DIFFPRIV REMOTE EQUIVALENCE. The DiffPriv application is remotely equivalent to a state machine with the following state:
A key pair and trusted hardware are initialized similar to the Notary application;
a remaining budget b, a real number; and
a sequence of rows, each consisting of a duplicate-detection nonce and a list of integer column values;
and including transitions that connect to the application, initialize the database, add a row, and perform a query.

SENSITIVITY. The value A used as a sensitivity parameter in a noise computation formula of the specification may be the actual sensitivity of a query result. For example, if we define A(D) as the answer the app computes when the database is D, then for any two databases $D_1$ and $D_2$, $|A(D_1)A(D_2)| \Delta$.

For verifiablility, Airavat-style queries may be used, where each query is a mapper that transforms a row into a single value, and a reducer that aggregates the resulting set, such that only the reducer affects sensitivity. The analyst can provide an arbitrary mapper; the DiffPriv may provide sensitivity properties for the single reducer sum. The DiffPriv application may take RowMin and RowMax parameters, clipping each mapper output value to a range. For example:

```
predicate DBsSimilar(d1:seq<Row>,d2:seq<Row>)
    |d1| == |d2| &&
    exists diff_row ::
        forall i :: 0 <= i < |d1| && i != diff_row ==> d1[i] == d2[i]
predicate SensitivitySatisfied(prog:seq<Op>, min:int, max:int, delta:int)
    forall d1:seq<Row>, d2:seq<Row> ::
        Valid(d1)&&Valid(d2)&&DBsSimilar(d1, d2) ==>
        -delta <= MapperSum(d1, prog, min, max) -
            MapperSum(d2, prog, min, max)
            <= delta
```

The DiffPriv application is verified to satisfy a predicate that relates reducer output sensitivity to the D used in noise generation.

Full System Verification

Figure 4:
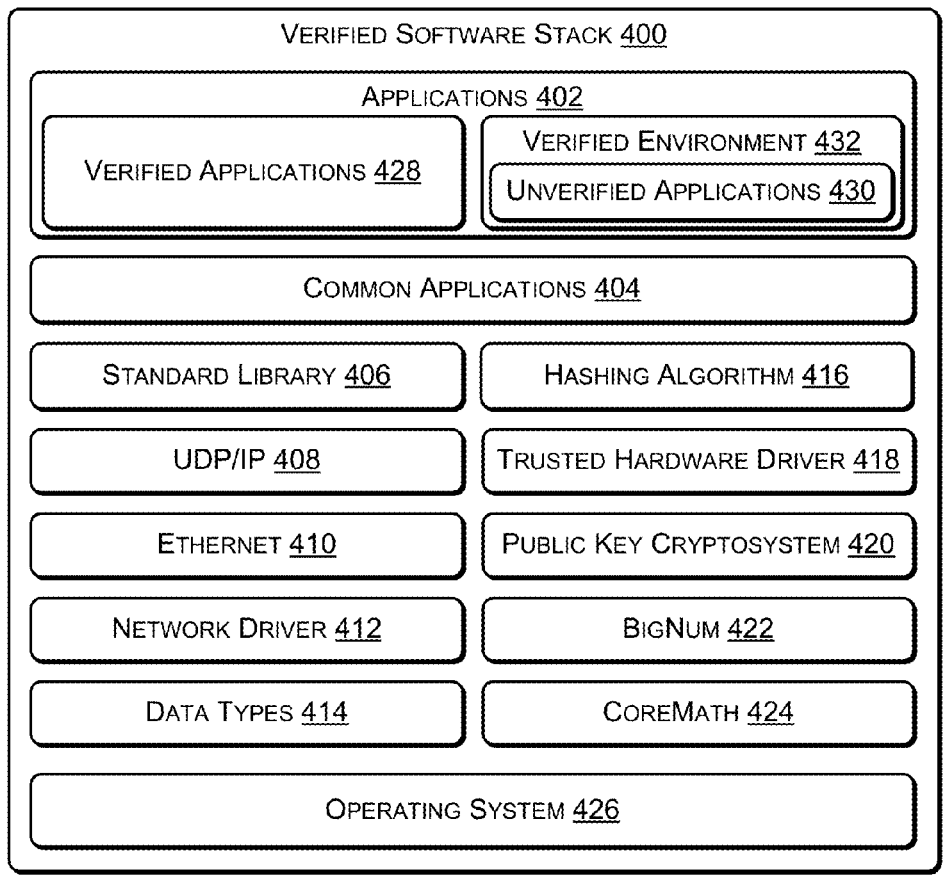
FIG. 4 is an illustrative architecture that includes a verified software stack (e.g., system) according to some implementations.

FIG. 4 is an illustrative architecture of a verified software stack (e.g., system) 400 according to some implementations. The software stack 400 includes one or more applications 402, one or more common applications 404, a standard library 406, a user datagram protocol/internet (UDP/IP) 408 protocol module, an Ethernet 410 protocol module, a network driver 412, one or more data types 414, a hashing algorithm 416 module, a trusted hardware driver 418, an public key cryptosystem 420 cryptosystem, a BigNum library 422 (e.g., used to perform cryptographic functions), a CoreMath library 424 (e.g., to perform scientific, engineering, or compute-intensive calculations), and an operating system 426 (e.g., a verified micro-kernel). In some cases, the hashing algorithm 416 may use secure hashing algorithm (SHA). Of course, different implementations may use other, different hashing algorithms. The applications 402 may include verified applications 428 and unverified applications 430. The unverified applications 430 may execute in a verified environment (e.g., sandbox) 432 that prevents the unverified applications 430 from maliciously harming (e.g., subverting) a remaining portion of the software stack 400, such as the verified applications 428, the operating system 426, or the like.

The applications 402 may include PassHash, Notary, TrInc, DiffPriv, another application or any combination thereof. The operating system 426 may include late launch, IOMMU, segmentation, page tables, another operating system utility, or any combination thereof. When a computer is running in a trusted state, e.g., verified software is executing on trusted hardware, loading an unverified software may cause a state of the entire computer to become un-trusted. Thus, the computer may switch between trusted and un-trusted states. The central processing units (CPUs) of the hardware may provide a hardware instruction which takes a memory location as a parameter, resets the hardware platform, atomically measures the unverified software located at that memory location, extends the unverified software into one of the PCRs of the computer and begins executing the unverified software in a hardware protected environment. This process of executing the unverified software in a hardware protected environment is referred to as Late Launch. As part of Late Launch, the CPU may disable direct memory (DMA) access to physical memory pages containing a secure boot loader, disable interrupts and hardware debuggers to prevent previously executing code from regaining control, reset the dynamic registers of PCR17 through PCR23 to 0, and execute the unverified software in a protected mode. Late Launch may provide security benefits similar to rebooting the computer (e.g., starting from a clean-slate), while bypassing the overhead of a full reboot (i.e., peripheral devices remain enabled, the BIOS and bootloader are not invoked, memory contents remain intact, etc.

The software code may include annotations, such as loop invariants, preconditions, and post-conditions to enable verification of the software code. The annotations may be viewed as lemmas that build to high-level theorems.

To illustrate steps for end-to-end verification of the system 400, several propositions are described. These propositions are stated briefly in plain English below for ease of understanding. It should be understood that the actual propositions may take the form of annotations in the high-level language implementation 112. The propositions described below are several key propositions that may be used when verifying the system 400.

IOMMU CONFIGURATION. Verified applications (e.g., Ironclad applications) may configure an input-output memory management unit (IOMMU) to divide memory into device-accessible and application exclusive private memory such that non-device operations access application exclusive private memory. The assembly language instruction specification may be used to determine that non-device memory operations only access application exclusive private memory that has been protected by the hardware's device exclusion vector, a simple IOMMU.

Some central processing units (CPUs) may provide a feature such as dynamic root-of-trust for measurement (DRTM), also known as late launch. The DRTM may reset the CPU to a known state, store a measurement (e.g., a hash code) of the in-memory code pointed to by an argument of an instruction, and jump to that code. After a late launch, the hardware may provide a software program control of the CPU along with 64 kilobytes (KB) of protected memory. To use more than 64 KB, the software program may first extend the IOMMU's protections, based on a specification associated with the configuration of the IOMMU. After extending the IOMMU's protections, the program may satisfy the preconditions for assembly language instructions to access memory outside the 64 KB region.

DEVICES SEE NO SECRET DATA, e.g., only non-secret data may be passed to devices. The assembly language instruction specifications may indicate that storing data to device-accessible memory, i.e., memory that the IOMMU allows devices to access, can only store non-secret data O (e.g., $O_L = O_R$). More specifically, the left and right executions may generate the same sequence of device stores: the same values to the same addresses, modulo timing and liveness. Informally, liveness is a requirement that "something good eventually happens" in a system or an algorithm (i.e., the system "makes progress"). Eventual consistency of a database is an example of a liveness property.

To prove $O_L = O_R$, the implementation code's input paths and output paths may be annotated with relational annotations. The input paths and output paths may include application event loops and a networking stack. For example, Ethernet, internet protocol (IP), and UDP layers may maintain relational properties on packets.

KEY IN TPM. Applications may correctly extend a public key into trusted hardware's PCR (e.g., PCR 19). The private key may be generated using a random number generator (e.g., TPM randomness) and never leave the trusted hardware platform.

ATTESTATION. Applications may generate a correct trusted hardware attestation after extending their public key into a PCR.

Corollary 2—SECURE CHANNEL. If a client receives a public key and an attestation, and the attested PCR code values (e.g., PCR 17, PCR 18) match those of a verified application, and the attested PCR data values (e.g., PCR 19) match the public key, and credentials (e.g., a certificate, a token, or the like) shows the attestation is from a trusted hardware provider, then the client may use the public key to establish a secure channel directly to the verified application.

Cryptographic Libraries

HASHING. The hashing algorithm 416 may conform to various standards (e.g., FIPS 180-4 and FIPS 198-1).

Lemma 11—CRYPTOSYSTEM OPERATIONS. Public Key Cryptosystem 420 may generate keys using consecutive randomness from the trusted hardware (e.g., not selectively sampled), and pass a primality test (e.g., the Miller-Rabin primality or similar test). Public Key Cryptosystem 420 may include commands to encrypt, decrypt, sign, and verify, including padding, and may produce byte arrays that conform to standards (e.g., PKCS 1.5 and RSA standards).

For some types of cryptographic primitives, such as hash functions, the verifier 108 may verify functional correctness. A cryptosystem specification, such as the RSA specification, derived from RFC 2313, defines encryption and signature operations as modular exponentiation on keys made of ideal integers. The key-generation specification may use a key that is derived from two random primes. The BigNum 420 library may be used to implement cryptographic primitives. The BigNum 420 library may implement arbitrary-precision integers using arrays of 32-bit words, provide operations such as division and modulo that are used for public key cryptosystems, such as RSA, etc. The BigNum 420 library may include BigRat which extends the provided operations to rational numbers, which may be used for differential privacy.

BIGNUM/BIGRAT CORRECTNESS. Each BigNum/BigRat operation may produce a value representing a correct infinite-precision integer or real number.

In some implementations, the compiler 114 may not be included in the trusted computing base (TCB). If the compiler 114 is not a part of the TCB, the assembly language implementation 116 may be verified by the verifier 108. The verifier 108 may use several invariants produced by the compiler 114, such as type safety, array bounds safety, and transitive stack safety.

TYPE SAFETY. The contents of every value and heap object may be verified to accurately represent the expected contents according to a type system used by the high-level language, such that operations on every value and heap object does not cause run-time type errors.

ARRAY BOUNDS SAFETY. Array operations may use an index that is within the bounds of the array.

TRANSITIVE STACK SAFETY. When a particular program is called, a stack has enough stack space remaining for the stack operations invoked by the particular program and any additional programs that the particular program may call. The stack may include a data structure to store information about a program. For example, when a program calls a subprogram (e.g., a subroutine) a snapshot of the program may be stored in the stack just before the sub-program is called. For example, the snapshot may include values of variables used by the program, etc. When the sub-program has completed executing, a state of the program may be restored using the snapshot stored in the stack so that execution of the program may resume. The term "stack" refers to a collection of one or more entities stored in a data structure. Operations to the collection may include a CALL operation (also known as a push) to add an entity to the collection and a RET operation (also known as pop) to remove an entity from the collection. The relation between the push and pop operations is such that the stack may be implemented as a Last-In-First-Out (LIFO) data structure. In a LIFO data structure, the last entity added to the structure may be the first entity to be removed. This is equivalent to, in a sequential collection, performing the push and pop operations at only one end of the data structure that stores the collection, referred to as the top of the stack.

Even if a high-level language is a type-safe language, the verifier 108 may not assume that the compiler 114 preserves type safety. Thus, the verifier 108 may verify type safety at the assembly language level by establishing type invariants for data structures that represent high-level language values. For example, pointers in data structures may point to values of an expected type, and arbitrary integers may not be used as pointers. Such type invariants may be maintained throughout the assembly language code and may be present in loop invariants, preconditions, post-conditions, or any combination thereof. Thus, an external assembly language type checker may not be used to check compiled assembly language implementation 116. Instead, a single verification process (e.g., performed by the verifier 108) may be used for both manually-written assembly language code and compiled code (e.g., the assembly language implementation 116).

HIGH-LEVEL PROPERTY PRESERVATION. Every program proves that an output stack state and registers satisfy high-level language post-conditions given high-level language preconditions. The compiler 114 may maintain high-level language annotations, such as preconditions, post-conditions, and loop invariants. Furthermore, the compiler 114 may connect the high-level annotations to low-level stack and register values, so that operations on stack and register values satisfy correctness theorems associated with the high-level language implementation 112 and the corresponding high-level specification 102.

OPERATING SYSTEM INVARIANTS. Operating system data structure invariants may be maintained.

GARBAGE COLLECTION CORRECTNESS. A memory manager of the operating system 426 may create representations of objects in the high-level language that conform to the semantics of the high-level language. A garbage collector of the operating system 426 may maintain correct object data, and may not leave dangling pointers, even when the garbage collector moves objects around in memory. The garbage collector may reclaim garbage that is stored in memory, e.g., objects in memory that have been allocated but are no longer in use. For example, if a system does not have any pointers that point to an allocated portion of memory, the allocated portion of memory may be reclaimed by the garbage collector for use by another program.

Figure 5:
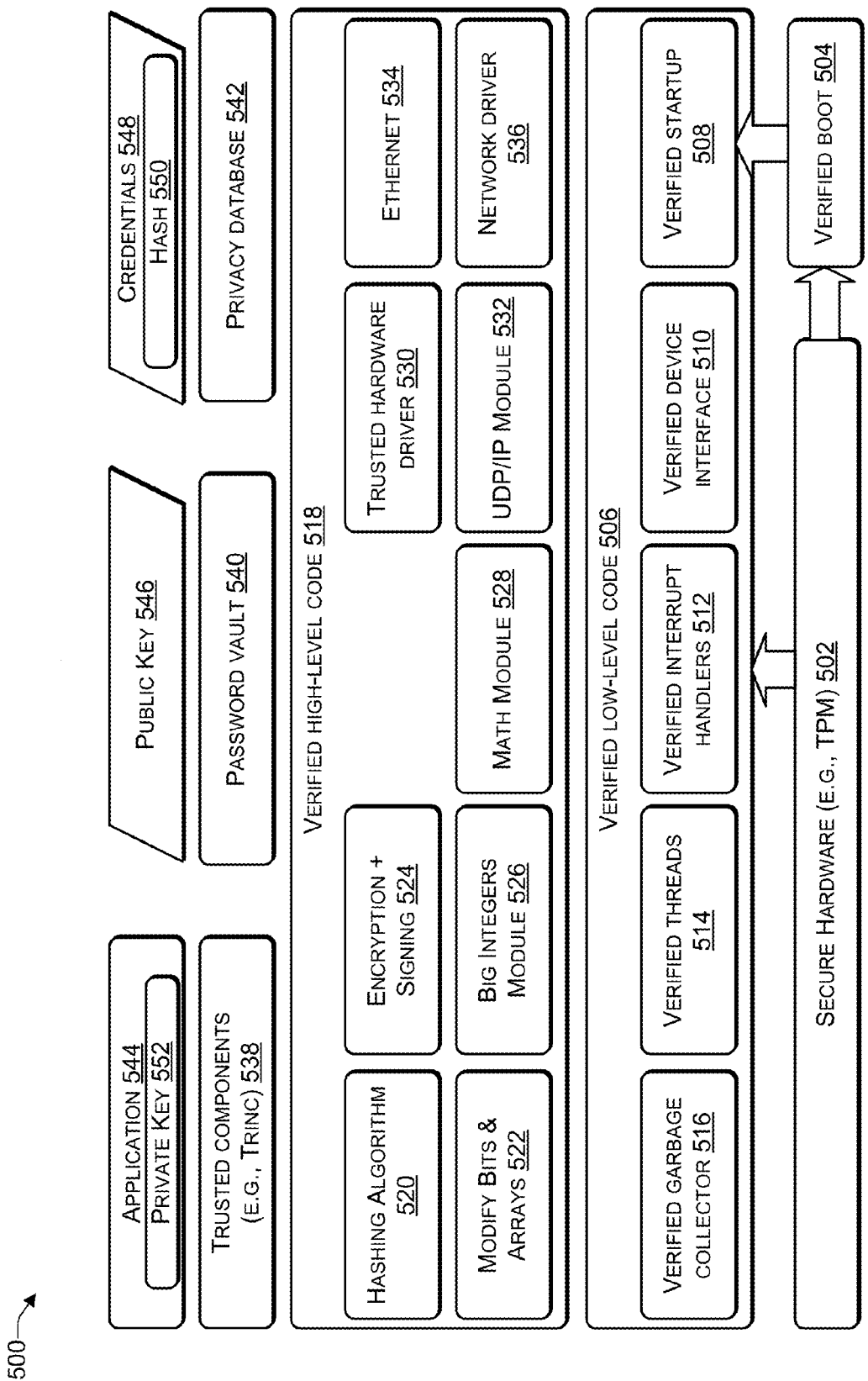
FIG. 5 is an illustrative architecture of verified software executing on secure hardware according to some implementations.

FIG. 5 is an illustrative architecture 500 of verified software executing on secure hardware according to some implementations. Trusted hardware 502 may comprise hardware that provides a hardware-based root of trust, such as a trusted platform module (TPM). For example, the trusted hardware 502 may record information associated with software execution on the trusted hardware 502 during a boot cycle in a way that can be securely reported, via an attestation protocol, to a remote party. The trusted hardware 502 may maintain records about a current boot cycle in the form of hash chains maintained in Platform Configuration Registers (PCRs). Software applications executing on the trusted hardware 502 may add new information to the PCRs via an extend operation. The extend operation may update the PCR to include a hash of a previous PCR value concatenated with the new information. The trusted hardware may hold a private key 552 (e.g., RSA key) that does not leave the trusted hardware and can be used to attest to the trusted hardware's current state by signing values in the PCRs. The trusted hardware may certify that the corresponding public key is held by a real hardware trusted hardware, preventing impersonation by software.

The architecture 500 may use late launch, also known as Dynamic Root of Trust for Measurement (DRTM). To help remove boot code from the trusted computing base (TCB) of secure operating systems and hypervisors, central processing units (CPUs) may provide an instruction that resets the CPU to a known state, stores in the trusted hardware a measurement (hash) of the in-memory code pointed to by the instruction's argument, and jumps to that code. This "late launch" or DRTM allows un-trusted software to boot, configure devices, load software, and then verifiably launch trusted software on a newly-reset CPU. The CPU instruction may put the CPU into a well-specified reset state, leaving devices and memory untouched. The CPU instructions may disable interrupts, configure the CPU's Device Exclusion Vector (DEV) and a bit-vector-based IOMMU to prevent devices from accessing a portion of memory, reset PCR 17 of the trusted hardware to a fixed value, and extend the register with a hash of the portion of memory. Finally, execution may jump to the code. Thus, a software application may leverage any bootstrapping that preceded its execution, while protecting the software application from other software applications and from other devices. In this way, the trusted hardware can attest to a remote verifier that the code is running in a protected environment.

The hardware 502 may perform a verified boot 504 of verified low-level code 506 (e.g., a micro-kernel or low-level operating system). The hardware 502 may perform and record a verified startup 508 of the verified low-level code 506. The verified low-level code 506 may include a verified device interface 510, verified interrupt handlers 512, verified threads 514, and a verified garbage collector 516. The verified device interface 510 may provide various types of input/output (I/O) to enable the architecture 500 to communicate with other devices. The verified interrupt handlers 512 may be used to perform various actions when an interrupt is received. The verified threads 514 may be part of a verified micro-kernel or other low-level operating system. The verified garbage collector 516 may collect allocated portions of memory that are no longer in use (e.g., no longer referenced) and that can be reclaimed and reused.

Verified high-level code 518 (e.g., applications, utilities, libraries, etc.) may execute on top of the verified low-level code 506. The verified high-level code 518 may include a hashing algorithm (e.g., SHA or similar algorithm) module 520, code to modify bits and arrays 522, code to perform cryptosystem (e.g., RSA) encryption and signing 524, a big integers module 526, a mathematics module 528, a trusted hardware driver 530, a UDP/IP module 532, an Ethernet module 534, and a network driver 536. It should be understood that the hashing algorithm module 520 is merely an example of one type of hashing algorithm that may be used and that other implementations may use other types of hashing algortihms.

Various applications may execute on top of the verified high-level code 518, such as trusted components 538 (e.g., TrInc, etc.), a password vault 540, and a privacy database 542 (e.g., that provides differential privacy).

At run time, an application 544 may provide a user (or a second application) with a public key 546 and a credentials 548 (e.g., a certificate, a token, or the like). The credentials 548 may be signed (e.g., using a hash 550) by the trusted hardware 502 to show that the public key 546 was proffered by a binary (e.g., corresponding to the entire software system) with a particular hash. The user (or the second application) may check that the hash 550 matches a previously observed hash (e.g., observed in an offline step). The trusted hardware 502 may furnish the credentials 548, signed by a hardware provider, indicating that the public key 546 is held exclusively by a trusted hardware platform (e.g., the trusted hardware 502). If the credentials 548 are valid and the hash 550 is correct, then a verified (e.g., verifiably secure) binary that includes the application 544 created the public key 546, and the recipient (e.g. a user or a second application) may interact with confidence and trust that messages signed with the public key 546 came from the application 544, and that messages sent to the application 544 that are encrypted with the public key 546 will be seen only by the application 544.

Thus, at run time, the user (or the second application) trusts that the core hardware 502 has not been tampered with but need not trust the software or peripherals associated with the hardware 502. A message from the application 544 may be signed with the public key 546 of the application 544. The trusted hardware 502 may attest that the public key 546 came from the executable with a cryptographic hash code (e.g., SHA1, SHA256, or the like), which should match a previously obtained (e.g., from an offline step) hash code. A provider of the trusted hardware 502 may certify that the public key 546 is held by the hardware 502, e.g., a trusted hardware platform.

An operating system (e.g., the operating system 426 of FIG. 4) included in the verified low-level code 506 may be modified and/or extended to eliminate unverified boot code and to provide a security-oriented memory model. The operating system may also verifiably respect security specifications of applications executing at higher levels. For example, a conventional operating system may depend on an unverified basic input/output system (BIOS) and an unverified bootloader for system configuration (e.g., device enumeration, device configuration, memory segmentation, memory paging, and the like). In some implementations, a verified BIOS and bootloader may be provided. In other implementations, rather than verify an existing BIOS and bootloader, late launch (e.g., DRTM) may be used to verifiably put the architecture 500 into a secure state and begin executing the verified low-level code 506 and the verified high-level code 518. While late launch simplifies the boot process, late launch may use verified code to configure the CPU after launch.

After a late launch, an application may have control of the CPU and a portion of memory (e.g., 64 kb). However, code running before the late launch may, in theory, replace device firmware or maliciously configure device direct memory access (DMA) buffers. A CPU-based input/output memory management unit (IOMMU) may protect the portion of the memory from access by unauthorized entities.

ESP may be a register that points to a top of a stack. EAX may be an accumulator register. In an example of an x86 processor architecture, memory addresses may be specified in two parts, called a segment and an offset. The segment may specify a beginning of a block of memory allocated by the system and the offset may be an index into the block of memory. Segment values may be stored in segment registers, such as a CS register that includes a segment of a current instruction and an SS register that may include a stack segment. Memory may be accessed using either an implicit or an explicit segment descriptor. A segment descriptor may include a base address and a limit. If an attempt is made to access memory address M using a descriptor with base B and limit L, then the actual memory address accessed is B+M, unless B+M>L. In the latter case, a segmentation fault may occur. Accesses to a stack (e.g., via push and pop instructions) may a SS segment, and accesses to code (e.g., to read the next instruction) may use a CS segment.

A formal specification of the architecture 500 may specify that upon boot to the verified low-level code 518, EAX may point to the verified low-level code 518, ESP may include EAX+64 KB, and SS and CS may describe flat segments. The DEV may be configured to protect EAX and ESP from external devices. EAX mode is a mode of operation for cryptographic block ciphers designed to simultaneously provide both authentication and privacy of a message (authenticated encryption) with a two-pass scheme, one pass for achieving privacy and one for authenticity for each block.

An idiomatic specification may describe how to navigate memory and to protect a large portion of memory. For example, satisfying the specification may provide that upper and lower bounds of memory that an application may access cover a larger portion of memory. DEV is a type of IOMMU that may be configured to prevent devices from reading or writing to a specified memory range, such as (EAX, EAX+64 KB).

Idiomatic means that the specification may not describe all the behavior of PCI or the DEV, but may describe the effects of a specific sequences of operations; e.g., rather than showing a complete road map (e.g., with all possible paths) and turn-by-turn directions to a particular destination. Although the hardware 502 may support other configurations, code attempting to use the hardware 502 may fail verification. Using an idiomatic specification may reduce a complexity of the specification, making the specification faster and easier to verify. For example, an idiomatic specification of x86 segmentation may specify that segment descriptors can have any base, but the length is $2^{32}$ and the privilege level (DPL) is 0.

A micro-kernel or operating system specification may specify the effects of segment accesses, including SS for CALL and RET instructions. CALL and RET instructions affect the stack, e.g., CALL pushes a previous instruction pointer value onto the stack and RET pops the stored instruction pointer value from the stack to know where execution should resume. Both CALL and RET may access memory via SS.

The specification may also specify descriptor shadow caching behavior; e.g., segment behavior may depend on the shadow value cached in the processor when the selector register is used rather than the descriptors in memory. Such specifications enable verification that, after a late launch, software code accesses a correct memory region, and unauthorized applications and/or devices are unable to tamper (e.g., access) the memory region. For example, in some implementation, the DEV may be configured to expose 128 MB of protected memory to a verified operating system (e.g., micro kernel) and a remainder of the memory may be used for I/O to devices.

To provide information flow guarantees about applications (e.g., to prove that the applications do not enable secret data to be determined), the boundary between verified code and the outside world (e.g., unverified code) may be defined. For example, memory regions protected by the DEV may be treated as internal while other memory regions (e.g., I/O and memory mapped device regions) are treated as unverified, because malicious devices may read or write to the memory at any time, and even benign devices (e.g., a network card) may, by design, expose data to unverified code and unverified devices. The boundary between verified and unverified code may be specified at the assembly code level.

For memory regions that can be proven to be protected by the DEV, the specification may specify a standard model of loads and stores, e.g., values written to memory via a store instruction can later be read back via a load instruction. In contrast, when reading and writing to memory that is not DEV protected, there is no such guarantee, since, in theory, a malicious device can change the values in memory at any time. The specification may specify that software instructions that cause a visible effect on un-trusted memory have a precondition that arguments provided to the instructions be public. For example, the arguments of a store instruction (e.g., an address and a value) may have a precondition that the arguments be public. As another example, the address argument of a load instruction may have a precondition that the argument be public, because other devices may be able to observe the address that is being accessed. Public values may be obtained via loads from un-trusted memory, constant values in the code, or values declassified by a trusted application-specific policy, e.g., a policy that lets encrypted secrets be transmitted. Any values that do not originate from the outside world, e.g., the random values obtained from the trusted hardware that are used to generate keys, may not be marked public, and hence may not leave the system except via a declassification policy.

Because information flow may be enforced at the machine code level on load and store instructions, a specification for the correctness of the network card or other network layers may not be used for a trusted computing base (TCB). Instead, the architecture 500 may repeatedly prove that interactions with the network produce public data. For example, a driver may propagate public inputs that are received from a network card up through a network stack, where the packets are processed by the Ethernet, IP, and UDP layers. Each layer may prove that the layer did not contaminate the packet with non-public data so that the application ultimately receives a stream of public packets. When transmitting, the top of the network stack implementation (e.g., the UDP layer) may request that data that is received from an application have already been designated as public data. This allows the network stack implementation to prove that the data provided to the IP layer is public, and so forth until ultimately the network driver proves that the individual words that the network driver stores to un-trusted memory are public data and therefore safe to release.

To enable applications to provide remote attestation and obtain secure randomness, an idiomatic specification is used for the trusted hardware and the verified trusted hardware driver 530. The trusted hardware specification may include pseudo-instructions that drive a two-level (e.g., lower-level and higher-level) model of the trusted hardware's state machine. In a lower-level state machine, instructions may write to or read from a data buffer one byte at a time and execute a command that is loaded using data and control registers. In a higher-level state machine, command executions may interpret the commands according to trusted hardware semantics. For example, commands that may be idiomatically specified may include trusted hardware commands such as Extend (e.g., add data to a PCR), Object-Independent Authorization Protocol (OIAP), LoadKey (e.g., loads a key into trusted hardware), Quote2 (e.g., performs a quote operation), and GetRand (e.g., a random number generator).

Extend, OIAP, LoadKey, and Quote2 may be included in a standard library (e.g., the standard library 406 of FIG. 4) and may be used to attest that a private key held by a verified application will treat the private key as secure data (e.g., by not enabling the private key to be determined). The GetRand command may provide a source of strong randomness used for generating cryptographic keys. The specification may specify a stream of random values that may be revealed sequentially by GetRand. For example, a specification for a library routine for creating a public key (e.g., RSA) that uses random inputs may draw sequentially from the stream of random values provided by GetRand, preventing malicious cherry-picking.

Figure 6:
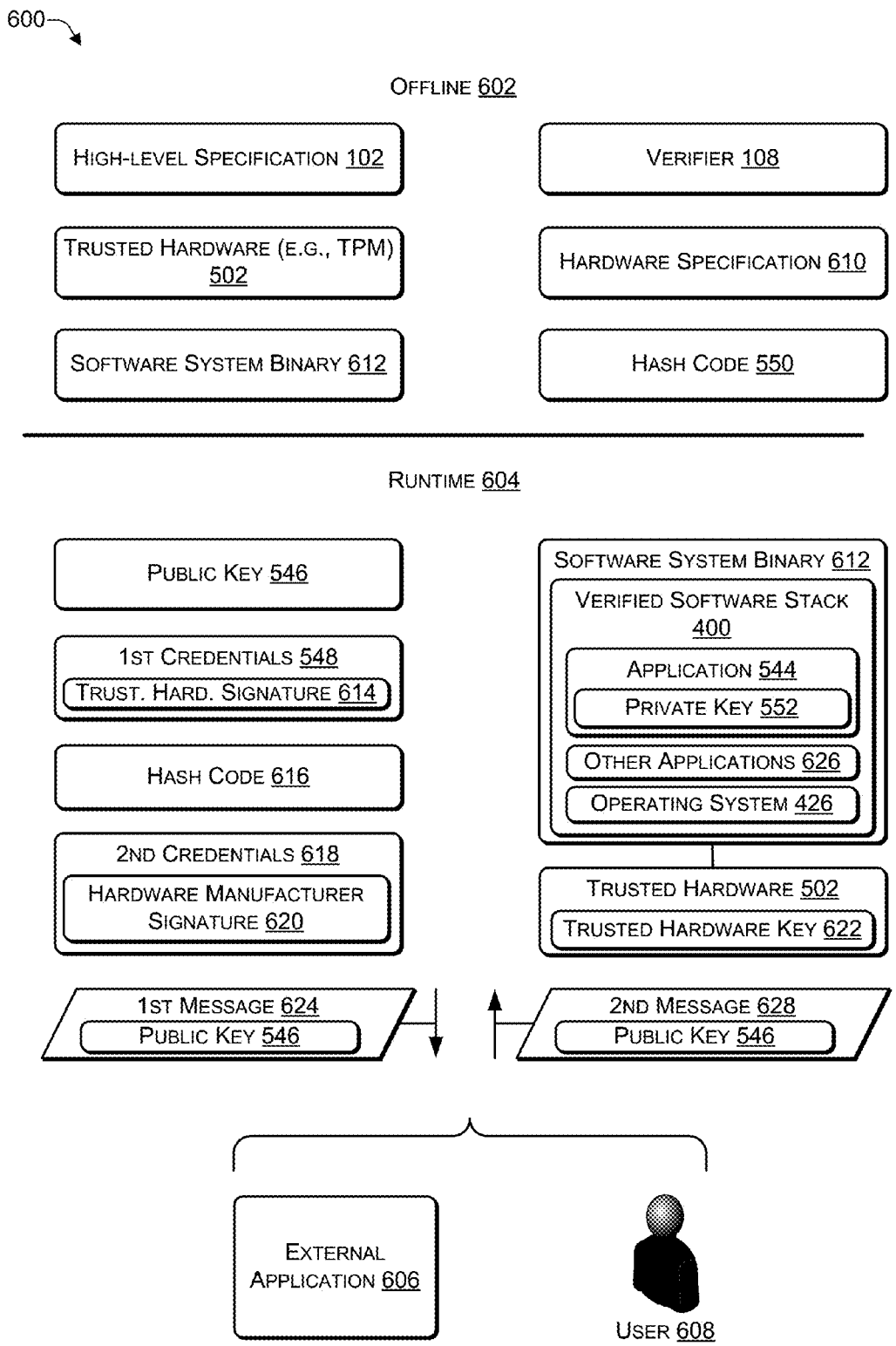
FIG. 6 is an illustrative architecture that includes offline and runtime according to some implementations.

FIG. 6 is an illustrative architecture 600 that includes offline operations 602 and runtime operations 604 according to some implementations. The offline operations 602 may include verifying that a software system (e.g., software stack) conforms to a corresponding system specification. The runtime operations 604 may include attestations that enable an external application 606 or a user 608 to verify that the software system, executing on hardware (e.g., trusted hardware), is secure and uncompromised. For example, the runtime operations 604 may enable the external application 606 (or the user 608) to send messages to and receive messages from an application of the verified software system without others (e.g., other applications or other hardware devices) being able to access the contents of the sent and received messages. For example, the messages that are sent and received may be encrypted using keys that enable the application and the external application to decrypt the messages. Other entities (e.g., other software or other hardware) may be unable to decrypt the messages.

In the offline operations 602, the external application 606 or the user 608 may accept the formal high-level specification 102, may trust verification tools (e.g., the verifier 108), may trust that a service provider will not physically alter the hardware 502, and may trust that a hardware specification (e.g., of the instruction set and the trusted hardware) models the hardware 502. Everything else, such as one or more of an application (e.g., the application 544), cryptographic libraries, sequence and math libraries, an operating system (e.g., the operating system 426), and a compiler may be considered un-trusted because they have merely been verified against the high-level specification 102.

After the high-level implementation 112 of FIG. 1 has been compiled to the assembly language implementation 116 and verified by the verifier 108 against the low-level specification 106, the assembler 118 may be used to create the machine code implementation 120. The machine code implementation 120 may be used to create a binary file (e.g., executable by one or more processors of the trusted hardware), such as a software system binary 612. A hashing function (e.g., cryptographic hash function or other hash function) may be used to create the hash code 550 (e.g., cryptographic hash code) based on the software system binary 612. The software system binary 612 may include the verified software stack 400.

During the runtime operations 604, the application 544 may send the public key 546 and first credentials 548 to the external application 606 or the user 608. The first credentials 548 may include a trusted hardware signature 614 (e.g., signed by the trusted hardware 502) to indicate that the public key 546 was provided by the software system binary 612. The external application 606 (or the user 608) may verify that a hash code 616 associated with the trusted hardware signature 614 matches the hash code 550 that was generated during the offline operations 602.

The trusted hardware 502 may provide second credentials 618 that includes a trusted hardware provider's signature 620 that is signed by a provider of the trusted hardware 502. The second credentials 618 may indicate that a trusted hardware key 622 is held exclusively by a legitimate hardware trusted hardware, e.g., the trusted hardware 502.

The external application 606 (or the user 608) may authenticate (e.g., verify that) credentials 548 and 618 are valid. The external application 606 (or the user 608) may verify that the hash code 616 matches the hash code 550, e.g., indicating that the verified software system binary 612 was used to create the public key 546. After authenticating the first credentials 548, the second credentials 618, and the hash code 616, the external application 606 (or the user 608) may securely interact with applications of the verified software stack 400. For example, when the external application 606 (or the user 608) receives messages, such as a first message 624 that includes the public key 546, the recipient can authenticate the first message 624 as being sent by the application 544 using the public key 546. The external application 606 (or the user 608) can trust that contents of the first message 624 are not accessible to other entities, such as other applications 626, other external applications, other external hardware, or the like. As another example, when the external application 606 (or the user 608) sends messages, such as a second message 628 that includes the public key 546, the external application 606 (or the user 608) can decrypt the second message 628 but not other entities (e.g., the other applications 626, other external applications, other external hardware, or the like). In this way, the external application 606 (or the user 608) can securely interact with the verified software stack 400 executing on the trusted hardware 502 in such a way that contents of messages (e.g., the messages 624 and 628) are accessible to the sender and the recipient but inaccessible to others (e.g., other software applications, external hardware, etc.).

Example Processes

Figure 7:
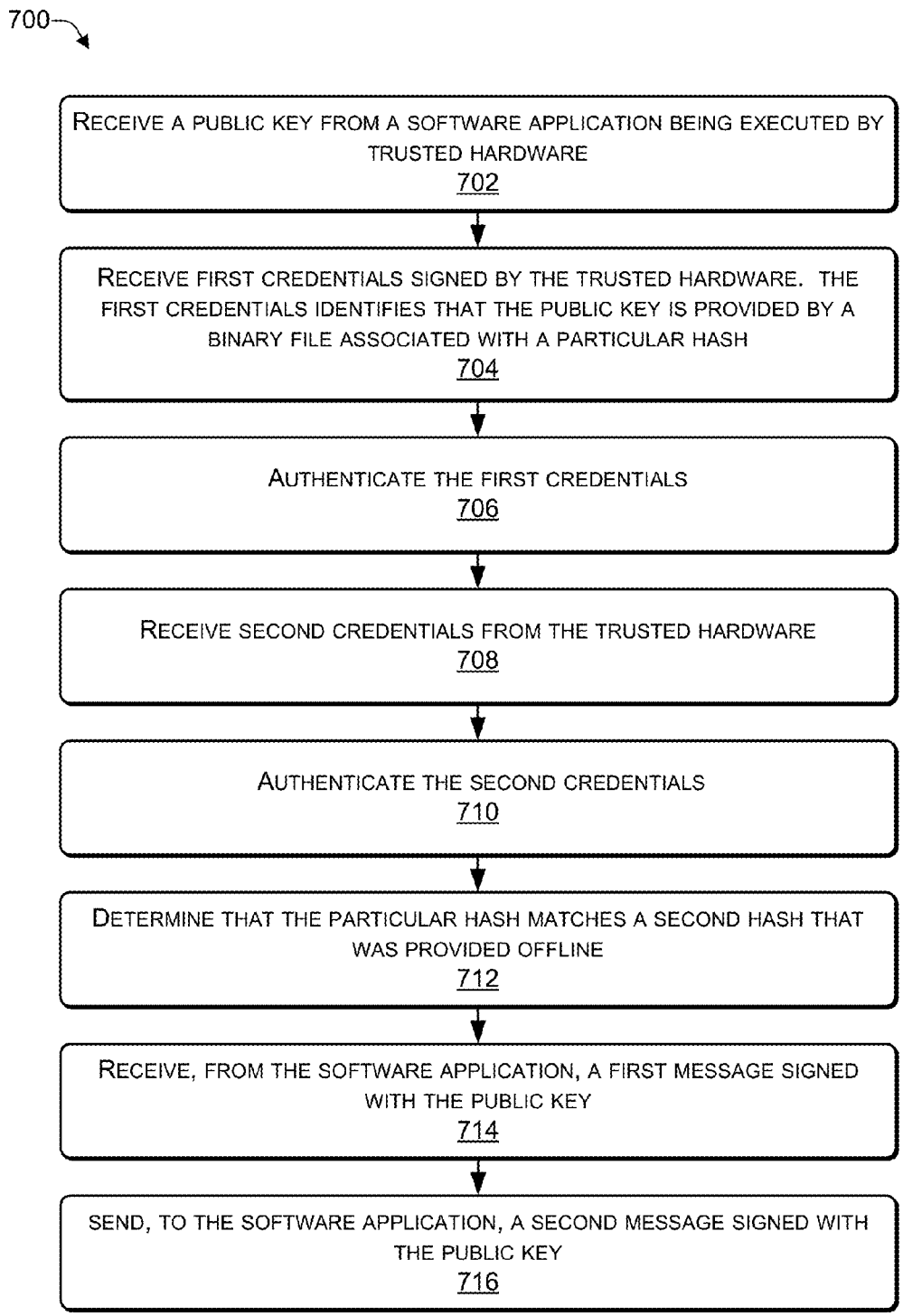
FIG. 7 is a flow diagram of an example process that includes receiving a public key from a software application according to some implementations.
Figure 8:
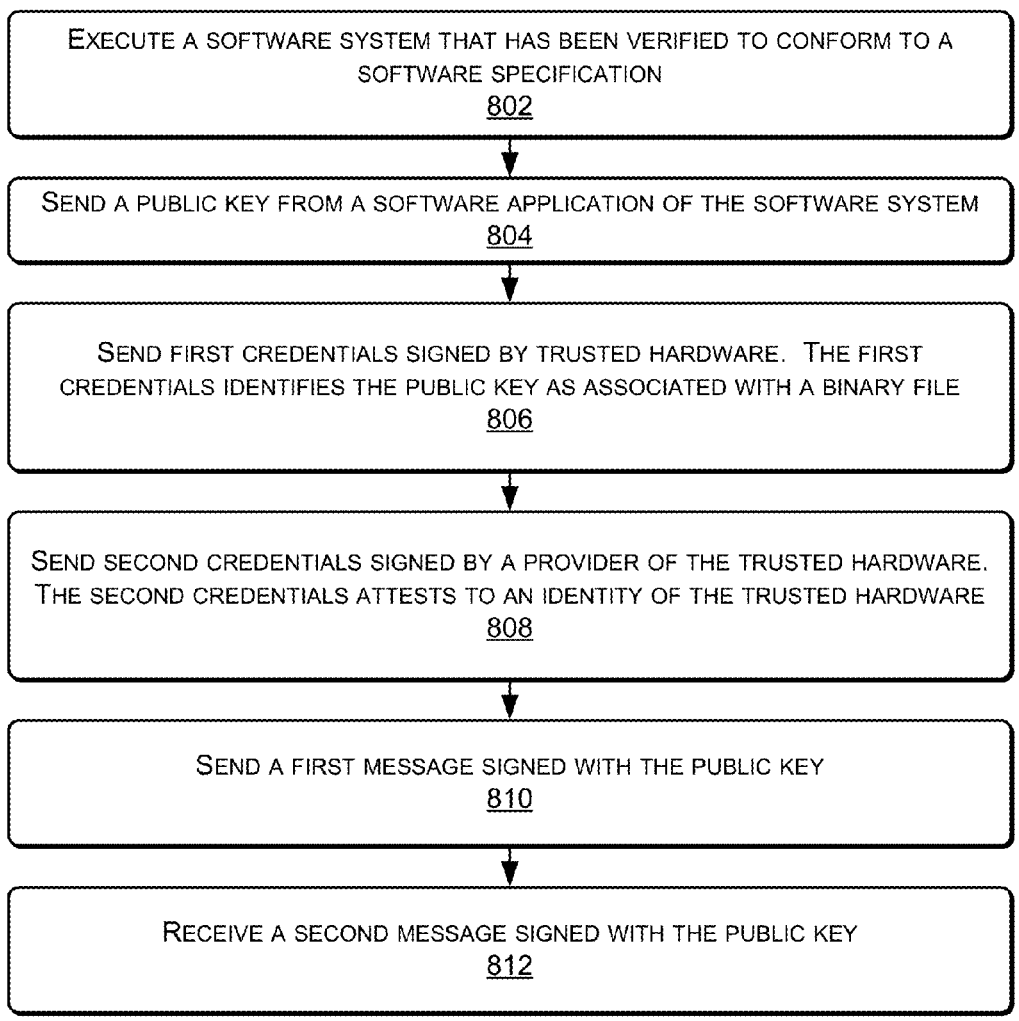
FIG. 8 is a flow diagram of an example process that includes executing a software system that has been verified to conform to a software specification according to some implementations.
Figure 9:
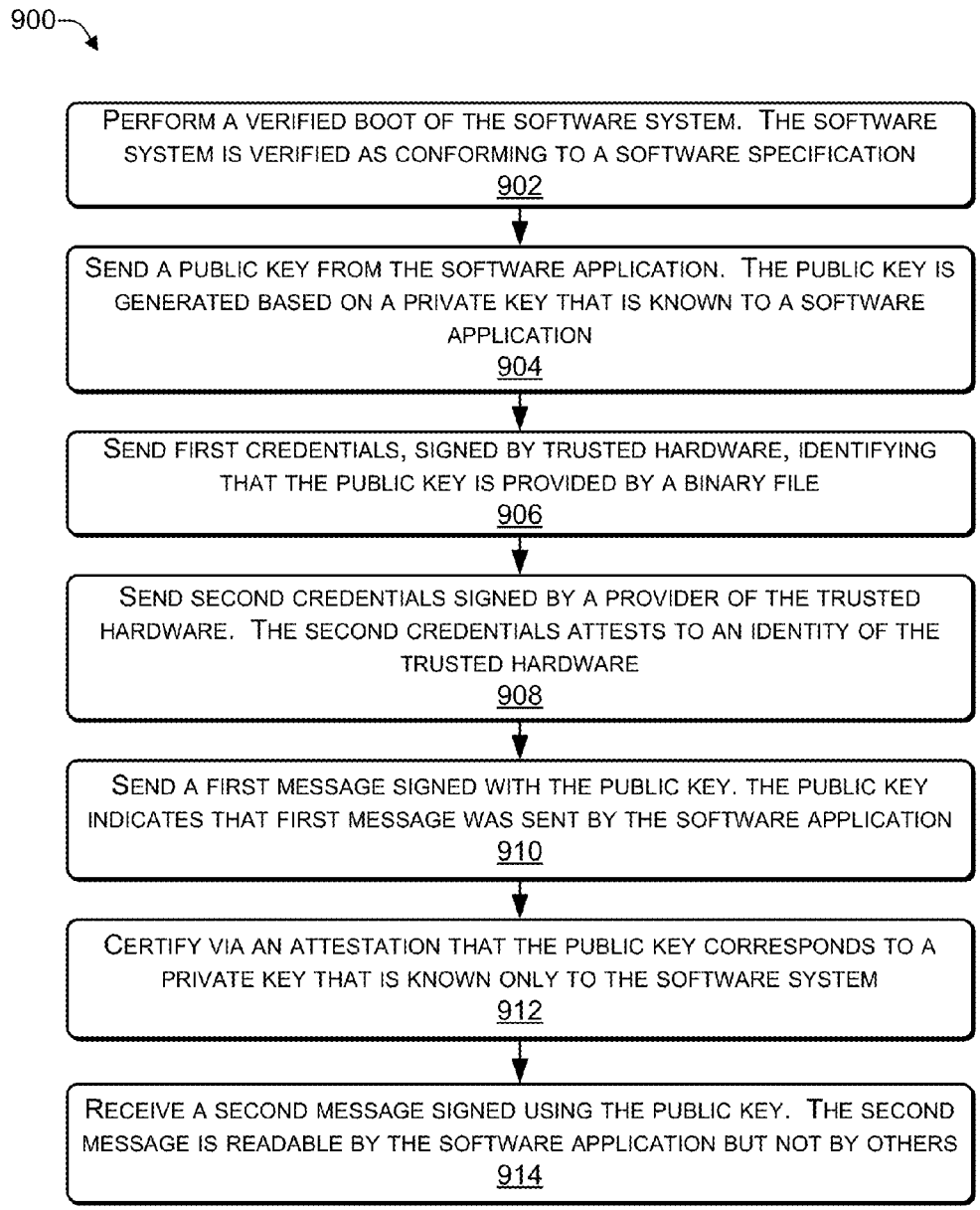
FIG. 9 is a flow diagram of an example process that includes performing verified boot of a software system according to some implementations.

In the flow diagrams of FIGS. 7, 8, and 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 700, 800 and 900 are described with reference to the architectures 100, 200, 300, 400, or 500, as described above, although other models, frameworks, systems and environments may implement these processes.

FIG. 7 is a flow diagram of an example process 700 that includes receiving a public key from a software application according to some implementations. The process 700 may be performed by the external application 606 of FIG. 6.

At 702, a public key may be received from a software application executing on a trusted hardware. For example, in FIG. 6, the external application 606 may receive the public key 546 from the application 544. The public key 546 may be generated based on the private key 552 of the application 544.

At 704, first credentials (e.g., a certificate, a token, or the like) that are signed by the trusted hardware may be received. The first credentials may identify that the public key is provided by a binary file that is associated with a particular hash code. At 706, the first credentials may be authenticated. For example, in FIG. 6, the external application 606 may receive the first credentials 548 and authenticate the first credentials 548 (e.g., using the trusted hardware signature 614).

At 708, second credentials may be received from the trusted hardware. At 710, the second credentials may be authenticated. For example, in FIG. 6, the external application 606 may receive the second credentials 618 and authenticate the trusted hardware provider's signature 620.

At 712, a determination may be made that the particular has matches a second hash that was provided offline (e.g., prior to execution of a software system that includes the software application). For example, in FIG. 6, the external application 606 may determine that the hash code 616, received during the runtime operations 604, matches the hash code 550, received during the offline operations 602.

At 714, a first message signed with the public key may received from the software application. For example, in FIG. 6, the external application 606 may receive the first message 624 signed with the public key 546. The public key 546 may indicate that the contents of the first message 624 are accessible to the application 544 and the external application 606 but inaccessible to other applications and other devices.

At 716, a second message signed with the public key may sent to the software application. For example, in FIG. 6, the external application 606 may send the second message 628 signed with the public key 546. The public key 546 may indicate that the contents of the second message 628 are accessible to the application 544 and the external application 606 but inaccessible to other applications and other devices.

Thus, after receiving credentials 548 and 618 attesting to the identity of the verified software and the trusted hardware on which the verified software is being executed, an external application may send and receive messages using a public key. The contents of the messages that are sent and received may be accessible to the sender and the recipient but inaccessible to others, thereby providing secure interactions.

FIG. 8 is a flow diagram of an example process 800 that includes executing a software system that has been verified to conform to a software specification according to some implementations. The process 800 may be performed by a trusted hardware, such as the trusted hardware 502 of FIGS. 5 and 6.

At 802, a verified software system may be executed. For example, in FIG. 6, the verified software stack 400 may be executed by the trusted hardware 502.

At 804, a public key may be sent by a software application. At 806, first credentials (e.g., a certificate, a token, or the like), signed by a trusted hardware, may be sent. The first credentials may identify the public key as being associated with a binary file (e.g., of the system software). The first credentials may thus attest to an identity of the software. At 808, second credentials, signed by a provider of the trusted hardware, may be sent. The second credentials may attest to an identity of the hardware (e.g., the trusted hardware) on which the software is executing. For example, in FIG. 6, the application 544 may send the public key 546, the first credentials 548, and the second credentials 618 to the external application 606. The first credentials 548 may attest to an identity of the verified software stack 400 and the second credentials 618 may attest to an identity of the trusted hardware 502. In this way, the external application 606 is assured that the external application 606 is interacting with the application 544 rather than other software and/or other hardware that is spoofing the identity of the application 544.

At 810, a first message signed with the public key may be sent. At 812, a second message signed with the public key may be received. The application 544 may send the first message 624 to the external application 606. The external application 606 may send the second message 628 to the application 544. The credentials 548, 618 and the public key 546 may enable the external application 606 and the application 544 to interact knowing that the contents of the messages 624 and 628 are accessible to the external application 606 and the application 544 but inaccessible to others, including the other applications 626 of the verified software stack 400, as well other software applications and/or hardware.

Thus, credentials 548 and 618 may be used to attest to the identity of the verified software system (e.g., verified software stack) and the trusted hardware, respectively. An application of the software system and an external application may exchange messages using a public key. The contents of the messages that are exchanged may be accessible to the application and the external application but inaccessible to others, thereby providing secure interaction.

FIG. 9 is a flow diagram of an example process 900 that includes performing verified boot of a software system according to some implementations. The process 900 may be performed by a trusted hardware, such as the trusted hardware 502 of FIGS. 5 and 6.

At 902, a verified boot of the software system may be performed. The software system may have previously (e.g., during offline operations) be verified as conforming to a software specification. For example, in FIG. 5, the trusted hardware hardware 502 may be perform the verified boot 504 of at least the verified low-level code 506.

At 904, a public key may be sent from the software application. The public key may be generated based on a private key that is known only to the software application. For example, in FIG. 6, the application 544 may generate the public key 546 based on the private key 552 and send the public key 546 to the external application 606.

At 906, first credentials, signed by a trusted platform module, may be sent. The first credentials may identify that the public key is associated with (e.g., created using) a binary file. For example, in FIG. 6, the application 544 may send the first credentials 548 to the external application 606. The first credentials 548 may attest to an identity of the software system binary 612, e.g., by determining that the hash code 616 (received during the runtime operations 604) matches the hash code 550 (provided during the offline operations 602).

At 908, second credentials signed by a provider of the trusted hardware may be sent. The second credentials may attest to an identity of the trusted hardware. For example, the application 544 may send the second credentials 618 attesting to an identity of the trusted hardware 502.

At 910, a first message signed with the public key may be sent. The public key may indicate that the first message was sent by the software application. At 912, the public key may be certified, via an attestation, that the public key corresponds to a private key that is known only to the software system. At 914, a second message may be received that is signed using the public key. The second message may be readable by the software application but not by others. For example, in FIG. 6, the application 544 may send the first message 624 to the external application 606. The first message may include the public key 546. The public key 546 may be certified via an attestation that the public key 546 corresponds to the private key 552. The application 544 may receive the second message 628 that signed using the public key 546. The contents of the first message 624 and the second message 628 may be accessible to the application 544 and the external application 606 but inaccessible to the other applications 626 as well as other external software and/or external devices.

Thus, the first credentials 548 may attest to the identity of the verified software stack 400 and the second credentials 618 may attest to the identity of the trusted hardware. An application of the software system and an external application may exchange messages using a public key that is derived from a private key that is known only to the application. The contents of the messages that are exchanged may be accessible to the application and the external application but inaccessible to others, thereby providing secure interaction.

Example Computing Device and Environment

Figure 10:
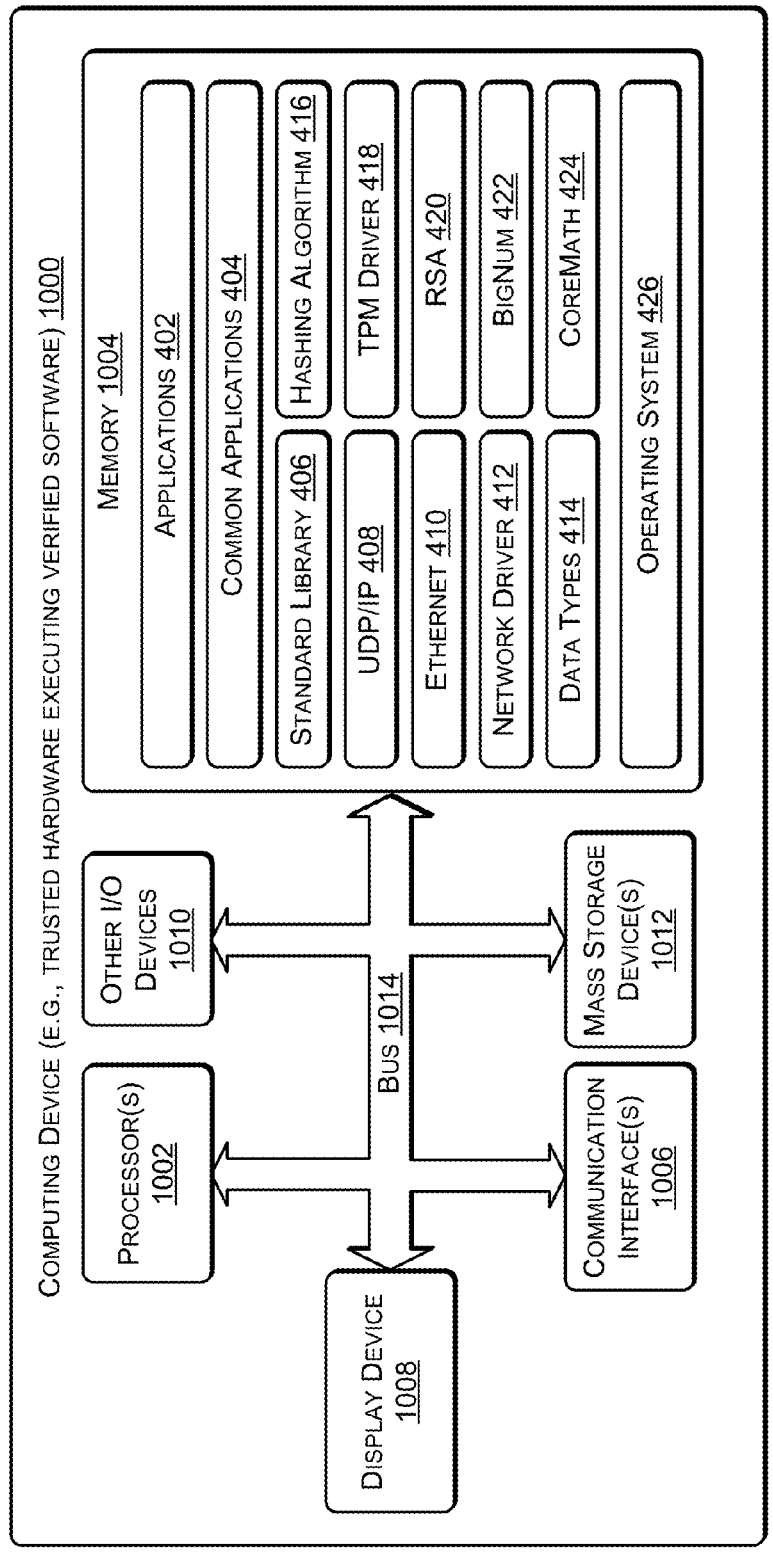
FIG. 10 is an illustrative architecture that includes a verified software system.

FIG. 10 illustrates an example configuration of a computing device 1000 (e.g., a trusted computing base or trusted platform module) and environment that can be used to implement the modules and functions described herein. The computing device 1000 may include at least one processor 1002, a memory 1004, communication interfaces 1006, a display device 1008, other input/output (I/O) devices 1010, and one or more mass storage devices 1012, able to communicate with each other, such as via a system bus 1014 or other suitable connection.

The processor 1002 may be a single processing unit or a number of processing units, all of which may include single or multiple computing units or multiple cores. The processor 1002 can be implemented as one or more microprocessors, microcomputers, microcontrollers, digital signal processors, central processing units, state machines, logic circuitries, and/or any devices that manipulate signals based on operational instructions. Among other capabilities, the processor 1002 can be configured to fetch and execute computer-readable instructions stored in the memory 1004, mass storage devices 1012, or other computer-readable media.

Memory 1004 and mass storage devices 1012 are examples of computer storage media for storing instructions which are executed by the processor 1002 to perform the various functions described above. For example, memory 1004 may generally include both volatile memory and non-volatile memory (e.g., RAM, ROM, or the like). Further, mass storage devices 1012 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 1004 and mass storage devices 1012 may be collectively referred to as memory or computer storage media herein, and may be a non-transitory media capable of storing computer-readable, processor-executable program instructions as computer program code that can be executed by the processor 1002 as a particular machine configured for carrying out the operations and functions described in the implementations herein.

The computing device 1000 may also include one or more communication interfaces 1006 for exchanging data with other devices, such as via a network, direct connection, or the like, as discussed above. The communication interfaces 1006 can facilitate communications within a wide variety of networks and protocol types, including wired networks (e.g., LAN, cable, etc.) and wireless networks (e.g., WLAN, cellular, satellite, etc.), the Internet and the like. Communication interfaces 1006 can also provide communication with external storage (not shown), such as in a storage array, network attached storage, storage area network, or the like.

A display device 1008, such as a monitor may be included in some implementations for displaying information and images to users. Other I/O devices 1010 may be devices that receive various inputs from a user and provide various outputs to the user, and may include a keyboard, a remote controller, a mouse, a printer, audio input/output devices, and so forth.

Memory 1004 may include modules and software components that can be used to create a verified software system. For example, in a trusted computing environment that includes a software system that has been verified, the memory 1004 may include the applications 402, the common applications 404, the standard library 406, UDP/IP 408, Ethernet 410, network driver 412, data types 414, hashing algorithm 416, trusted hardware driver 418, public key cryptosystem 420, BigNum 422, CoreMath 424, and operating system 426. In a software development system, the memory 1004 may also include, from FIG. 1, the high-level specification 102, the specification translator 104, the low-level specification 106, the verifier 108, the verification result 110, the high-level implementation 112, the compiler 114, the assembly language implementation 116, the assembler 118, and the machine code implementation 120.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

As used herein, "computer-readable media" includes computer storage media and communication media. Computer storage media includes volatile and non-volatile, removable and non-removable media implemented in any method or technology for storage of information, such as computer readable instructions, data structures, program modules, or other data. Computer storage media includes, but is not limited to, random access memory (RAM), read only memory (ROM), electrically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations," "an example," "some examples," "some implementations" or the like means that a particular feature, structure, or characteristic described is included in at least one implementation or example, and the appearances of these phrases in various places in the specification are not necessarily all referring to the same implementation. Unless otherwise indicated, the various implementations and examples provided are not intended to be mutually exclusive and may be used individually or in combination with one another.

EXAMPLES

As a first example, a software system that has been verified to conform to a software specification may be executed by secure hardware. The software system may include an operating system and a software application. A public key may be sent from the software application to an external application that is external to the software system. First credentials signed by the secure hardware may be sent to the external application. The first credentials may identify that the public key is associated with the software system. Second credentials signed by a provider of the secure hardware may be sent to the external application. The second credentials may attest to an identity of the secure hardware. The public key may be generated based on a private key that is known to the software system but unknown to other software systems. The second credentials may be signed by the secure hardware using a second key. A first message that is signed with the public key may be sent. The public key may indicate that the first message was sent by the software system. A second message signed using the public key may be received. The second message may be readable by the software system but unreadable by other software systems. The software system may be verified as conforming to the software specification by determining that an assembly language implementation of the software system implements a functionally correct version of the software specification. Verifying that the software system conforms to the software specification may include demonstrating remote equivalence. Demonstrating remote equivalence may include determining the functional correctness of properties described in the software specification and proving noninterference between at least two components of the software system. As a second example, a verified boot of a software system may be performed. The software system may be verified as conforming to a software specification. The software system may include a software application. A public key may be sent from the software application to an external application that is external to the software system. The public key may be generated based on a private key that is known to the software application but unknown to other software systems. A first certificate signed by the secure hardware may be sent to the external application. The first certificate may identify that the public key is provided by a binary file of the software system. A second certificate signed by a provider of the secure hardware may be sent to the external application. The second certificate may attest to an identity of the secure hardware. Sending the second certificate signed by the provider of the secure hardware to the external application may include: (1) signing the second certificate using a second key to create a signed second certificate, and (2) sending the signed second certificate. A first message signed with the public key may be sent. The public key may indicate that the first message was sent by the software system. An attestation may certify that (1) the public key corresponds to the private key and (2) the private key is known only to the software system. A second message that is signed using the public key may be sent. The second message may be readable by the software system but unreadable by other software systems. The software system may be verified as conforming to a software specification before performing the verified boot of the software system. For example, the software system may be verified as conforming to a software specification by demonstrating remote equivalence. The server may comprise secure hardware. The verifying may include demonstrating secure remote equivalence. A first component of the software system may be verified as being incapable of subverting a second component of the software system. As a third example, a public key may be received from a software system being executed by secure hardware. First credentials signed by the secure hardware may be received. The first credentials may attest that the public key is provided by a binary file of the software system. Second credentials may be received from the secure hardware attesting to an identity of the secure hardware. The first credentials and the second credentials may be authenticated to determine whether the public key was provided by the software system being executed by the secure hardware. The public key may be based on a private key that is known only to the software system. The second credentials may be signed by a provider of the secure hardware. A system hash associated with software system may be determined to match a previous hash that was provided before the software application began executing on the secure hardware. A first message signed with the public key may be received from the software system. The public key may be used to authenticate that the first message was sent by the software application. A second message, signed with the public key, may be sent to the software system. The second message may be decryptable using a private key maintained by the software application.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification.

What is claimed is:

1. One or more computer-readable memory storage devices storing instructions that, when executed by one or more processors, program the one or more processors to perform acts comprising:
   executing, by secure hardware, a software system that has been verified to conform to a software specification, the software system including an operating system and a software application;
   sending a public key from the software application to an external application that is external to the software system, wherein the public key corresponds to a private key that is known only to the software system;
   sending first credentials signed by the secure hardware to the external application, wherein the first credentials identifies that the public key is associated with the software system; and
   sending second credentials comprising a second certificate signed using a second key by a provider of the secure hardware to the external application, the second credentials attesting to an identity of the secure hardware.

2. The one or more computer-readable memory storage devices of claim 1, wherein the acts further comprise:
   sending a first message signed with the public key, the public key indicating that the first message was sent by the software system.

3. The one or more computer-readable memory storage devices of claim 1, wherein the acts further comprise:
   receiving a second message signed using the public key, the second message readable by the software system but unreadable by other software systems.

4. The one or more computer-readable memory storage devices of claim 1, wherein verifying that the software system conforming to the software specification comprises:
   determining that an assembly language implementation of the software system implements a functionally correct version of the software specification.

5. The one or more computer-readable memory storage devices of claim 1, wherein verifying that the software system conforming to the software specification comprises:
   demonstrating remote equivalence.

6. The one or more computer-readable memory storage devices of claim 5, wherein demonstrating remote equivalence comprises:
   determining a functional correctness of properties described in the software specification; and
   proving noninterference between at least two components of the software system.

7. A server comprising:
   one or more processors; and
   a memory device storing instructions executable by the one or more processors to perform acts comprising:
       performing a verified boot of a software system, the software system verified as conforming to a software specification, the software system including an operating system and a software application;
       sending a public key from the software application to an external application that is external to the software system, the public key generated based on and corresponding to a private key that is known only to the software system;
       sending a first certificate signed by secure hardware to the external application, wherein the first certificate identifies that the public key is associated with the software system; and
       sending a second certificate signed using a second key by a provider of the secure hardware to the external application, the second certificate attesting to an identity of the secure hardware.

8. The server of claim 7, wherein the acts further comprise:
   determining that an assembly language implementation of the software system implements a functionally correct version of the software specification.

9. The server of claim 7, wherein the acts further comprise:
   sending a first message signed with the public key, the public key indicating that the first message was sent by the software system.

10. The server of claim 9, wherein the acts further comprise:

proving noninterference between at least two components of the software system.

11. The server of claim 7, wherein the acts further comprise:
sending a second message signed using the public key, the second message readable by the software system but unreadable by other software systems.

12. The server of claim 7, wherein the acts further comprise:
verifying that the software system conforms to a software specification before performing the verified boot of the software system, the verifying comprising demonstrating remote equivalence.

13. The server of claim 12, wherein:
the server comprises secure hardware; and
the verifying further comprises demonstrating secure remote equivalence.

14. The server of claim 7, wherein the acts further comprise:
verifying that a first component of the software system is incapable of subverting a second component of the software system before determining that the software system conforms to a specification.

15. A computer-implemented method comprising:
receiving, by an external application that is external to a software system, a public key from the software system, the software system executed by secure hardware and verified to conform to a software specification, wherein the software system includes an operating system and a software application, and wherein the public key corresponds to a private key that is known only to the software system;
receiving, by the external application, first credentials signed by the secure hardware, wherein the first credentials attest that the public key is associated with the software system;
receiving, by the external application, second credentials comprising a second certificate signed using a second key by a provider of the secure hardware attesting to an identity of the secure hardware; and
authenticating, by the external application, the first credentials and the second credentials to determine that the public key was provided by the software system being executed by the secure hardware.

16. The computer-implemented method of claim 15, further comprising:
determining that an assembly language implementation of the software system implements a functionally correct version of the software specification.

17. The computer-implemented method of claim 15, further comprising:
demonstrating remote equivalence between the software system and the software specification.

18. The computer-implemented method of claim 15, further comprising:
determining that a system hash associated with the software system matches a previous hash that was provided before the software application began executing on the secure hardware.

19. The computer-implemented method of claim 15, further comprising:
receiving, from the software system, a first message signed with the public key; and
authenticating, using the public key, that the first message was sent by the software application.

20. The computer-implemented method of claim 15, further comprising:
sending, to the software system, a second message signed with the public key, wherein the second message is decryptable using a private key maintained by the software application.

* * * * *